United States Patent [19]
Maekawa et al.

[11] Patent Number: 5,978,124
[45] Date of Patent: Nov. 2, 1999

[54] LIGHT EMITTING CONTROL APPARATUS AND OPTICAL TRANSMITTER

[75] Inventors: Eiji Maekawa, Kanagawa; Susumu Satoh, Tokyo; Kuniaki Motoshima, Tokyo; Tadayoshi Kitayama, Tokyo, all of Japan

[73] Assignee: Mitsubishi Denki Kabushiki Kaisha, Tokyo, Japan

[21] Appl. No.: 08/636,792

[22] Filed: Apr. 22, 1996

[30] Foreign Application Priority Data

Apr. 28, 1995 [JP] Japan ................................ 7-105894

[51] Int. Cl.$^6$ ............................................ H04B 10/04
[52] U.S. Cl. ............................. 359/187; 372/29; 372/38
[58] Field of Search ............................. 359/152, 153, 359/180, 181, 187, 188; 372/29, 31, 33, 38

[56] References Cited

U.S. PATENT DOCUMENTS

| | | |
|---|---|---|
| 4,709,369 | 11/1987 | Howard . |
| 4,827,116 | 5/1989 | Takagi et al. . |
| 4,912,714 | 3/1990 | Hatanaka et al. ................ 372/31 |
| 5,260,956 | 11/1993 | Inaba et al. ...................... 372/38 |
| 5,477,557 | 12/1995 | Inaba et al. ...................... 372/38 |
| 5,677,779 | 10/1997 | Oda et al. ........................ 359/152 |
| 5,724,170 | 3/1998 | Aizawa ............................ 359/187 |

*Primary Examiner*—Rafael Bacares

[57] ABSTRACT

A light emitting control apparatus comprises a light emitting element which emits a light when an input electrical signal is converted into a light signal, a monitoring circuit which monitors the output level of the light emitting element, a sample-and-hold circuit which detects a peak value and is put into the sample mode when data of the monitoring circuit is in the mark state showing voltage and which is in turn put into the hold mode when the data is in the space state showing no voltage, and an amplifier which accomplishes negative feedback control of the output level of the light emitting element by using the output of the sample-and-hold circuit. Thus, the apparatus can quickly respond to a change of the input state and stabilize the output level of the light emitting element for a long time.

34 Claims, 13 Drawing Sheets

LIGHT EMITTING CONTROL APPARATUS AND OPTICAL TRANSMITTER

BACKGROUND OF THE INVENTION

1. Field of the Invention

The present invention relates to an optical transmitter apparatus which controls an output level when a digital electrical signal input, continuously or in bursts, is converted into a light signal.

2. Discussion of the Related Art

FIG. 13 discloses an optical power outputting apparatus as an example of a conventional light emitting control apparatus. This apparatus has been described on page 55–60, volume 11 of the technical report OCS-93-53, 1993 of the Institute of Electronics, Information and Communication Engineers of Japan. In FIG. 13, the optical power outputting apparatus is comprised of a buffer circuit 1, a voltage-to-current converter 2, a light emitting element 3, an optical fiber 4, a monitoring circuit 5, a first peak detection circuit 6, a differential amplifier 7, a second peak detection circuit 8, a control circuit 9, and a light signal off detection circuit 10.

Next, the operation of this apparatus is described.

First, an automatic power control operation (hereinafter referred to as the APC operation) is described. It is assumed herein that an input signal has low and high levels.

After having been reformed in its waveform via the buffer circuit 1, the input signal is divided into two branched signals. The first of the two branched signals is outputted to the voltage-to-current converter 2. In the voltage-to-current converter 2, a current signal which is turned on and off corresponding to the input signal's on/off state is generated. The current signal drives the light emitting element 3 to output a light signal which is sent to the optical fiber 4.

A fraction of the optical output of the light emitting element 3 is converted into a monitoring signal via the monitoring circuit 5. The monitoring signal is then input into the second peak detection circuit 8. In the second peak detection circuit 8, a peak value of the output of the monitoring circuit 5 is detected and is outputted to the differential amplifier 7.

The second of the branched signals from the buffer circuit 1 is input into the first peak detection circuit 6. In the first peak detection circuit 6, a peak value is detected, and outputted to the differential amplifier 7. In the differential amplifier 7, a difference of the peak values between the first peak detection circuit 6 and the second peak detection circuit 8 is detected, amplified, and input into the control circuit 9. The amplitude of the current from the voltage-to-current converter 2 is adjusted by the control circuit 9 so as to keep the difference between the inputs of the differential amplifier 7 almost zero at all times.

In the case where the input signal has only low and high levels, the output of the second peak detection circuit 8 always remains constant as long as a signal is being input into the second peak detection circuit 8. Therefore, by means of the operation described above, the optical output of the light emitting element 3 is controlled to be constant at all times.

Next, an operation for generating an alarm will be described.

The output of the second peak detection circuit 8, which executes peak detection of the optical output of the light emitting element 3 as described before, is divided and input into the differential amplifier 7 for the APC operation, and is also input into the light signal off detection circuit 10. In the light signal off detection circuit 10, a detection level from the second peak detection circuit 8 is compared with a predetermined reference level, and when the level falls to or below the predetermined reference level, a light signal off alarm is generated.

In order to avoid a failure where comparison of the data input level for the light signal off detection circuit 10 is made without data output from the second peak detection circuit 8 during the above-described operation for generating the alarm, Japanese Unexamined Patent Application HEI2-193426 discloses a related art in which, with the data input, a mark ratio of the data (used herein to mean a ratio of a mark period to a predetermined data transmission period) is detected, and an alarm reference level is set, responsive to the mark ratio. The mark level, however, does not vary with the mark ratio.

On the other hand, Japanese Unexamined Patent Application HEI4-249721 discloses another related art in which detection of data input is performed in one peak detection circuit and monitoring of the optical output is performed in another peak detection circuit. Using the outputs of these peak detection circuits, a certain result can be obtained and calculated via a predetermined mathematical algorithm. Then, by using the result, a part failure can be identified.

In the conventional optical power outputting apparatus as described hereinbefore, in order to hold the peak values constant even if intervals for signal bursts between one signal input and the subsequent signal input (hereinafter referred to as a burst interval) fluctuate, time constants of the first peak detection circuit 6 and the second peak detection circuit 8 for a peak-hold operation are set to become or exceed the maximum burst interval. Accordingly, when an initial rise of the subsequent signal input in bursts occurs after the peak detection circuits have been discharged fully with no signal input for a long time, it will take time for the first and second peak detection circuits to recognize a final peak input state. Therefore, time is necessary to stabilize the optical output.

In the conventional optical power outputting apparatus, alarm generation is controlled by a change of the output level of the second peak detection circuit 8. This creates a problem in that an alarm is generated by a no data input condition which would not normally have generated the alarm.

As already described to be another conventional related art, when the part failure is identified by comparing both input and output conditions, a peak value is usually detected after several signal input in bursts due to the poor following property of the peak detection circuit. In this case, although the properties of the peak detection circuit used for detection are not clearly defined and are exhibited differently depending upon the situation where the circuit is used, a time constant for peak detection is generally large. Therefore, the conventional optical power outputting apparatus cannot respond quickly to a change of the input state.

SUMMARY OF THE INVENTION

The present invention is made to solve the above-described problems. It is, therefore, an object of the present invention to provide a light emitting control apparatus which immediately recognizes a rise of the input and initiates a following operation, and which retains the output level accurately and continuously for a long period of time even if the mark ratio of input data fluctuates greatly.

Furthermore, it is another object of the present invention to provide a light emitting control apparatus which reproduces accurate, low and high levels of the signal by adjusting the space level of the input data.

It is a further object of the present invention to provide a light emitting control apparatus which detects a failure of the apparatus immediately when input data is in the mark state.

A light emitting control apparatus to which the present invention is applicable is provided with a light emitting element which is responsive to an input signal, and a monitoring circuit which detects the output level of the light emitting element. The apparatus aims to control low and high output levels of the light emitting element.

According to one aspect of the present invention, the light emitting control apparatus comprises a sample-and-hold circuit and an amplifier. The sample-and-hold circuit has a sample mode and a hold mode. When the input signal is "1" corresponding to "light ON" state, the sample-and-hold circuit is put into the sample mode and tracks the output level which has been detected by the monitoring circuit. On the other hand, when the input signal is "0" corresponding to "light OFF" state, the sample-and-hold circuit is put into the hold mode and holds the output level determined when it switched into the hold mode. The amplifier receives the output level from the sample-and-hold circuit and controls the low output level or the high output level of the light emitting element by providing the correct output level to the light emitting element.

According to another aspect of the present invention, the light emitting control apparatus may further comprise a second sample-and-hold circuit and a second amplifier. The second sample-and-hold circuit complementarily functions with the first sample-and-hold circuit such that when the first sample-and-hold circuit is in the hold mode, the second sample-and-hold circuit is put into the sample mode and tracks the output level which has been detected by the monitoring circuit. Alternatively, when the first sample-and-hold circuit is in the sample mode, the second sample-and-hold circuit is put into the hold mode and holds the output level determined when it switched into the hold mode. The second amplifier receives the output of the second sample-and-hold circuit and controls the other of the low output level or the high output level of the light emitting element, not controlled by the first sample-and-hold circuit.

According to another aspect of the present invention, the light emitting control apparatus may further comprise a burst detection circuit. The burst detection circuit detects an off-state of the input signal when the signal has not been input for more than a predetermined period. The burst detection circuit controls the sample-and-hold circuit while the input signal is detected.

According to another aspect of the present invention, the light emitting control apparatus may further comprise the burst detection circuit which functions in the same manner as the sample-and-hold circuit, and a light off detector. The burst detection circuit has the sample mode and the hold mode. The burst detection circuit tracks the level of the input signal in the sample mode while the input signal is in the mark state. On the other hand, the burst detection circuit, in the hold mode, holds the level of the input signal determined when it switched into the hold mode. The light off detector detects a cutoff of the output level of the light emitting element by comparing the output of the sample-and-hold circuit with the output of the burst detection circuit.

According to yet another aspect of the present invention, the sample-and-hold circuit of the light emitting control apparatus has a first emitter follower. The first emitter follower tracks the output level of the monitoring circuit and outputs the output level to a resistor-capacitor serial circuit. The sample-and-hold circuit outputs the voltage of a capacitor in the resistor-capacitor serial circuit through a second emitter follower as the output of the sample-and-hold circuit. The current of the first emitter follower is turned on/off by a sample-and-hold control circuit which is turned on/off with a control signal.

BRIEF DESCRIPTION OF THE DRAWINGS

The invention will be described in more detail in conjunction with appended drawings, wherein.

DETAILED DESCRIPTION OF PREFERRED EMBODIMENTS

Next, a light emitting control apparatus according to the embodiments of the present invention will be described in conjunction with drawings.

Embodiment 1

Figure 1:
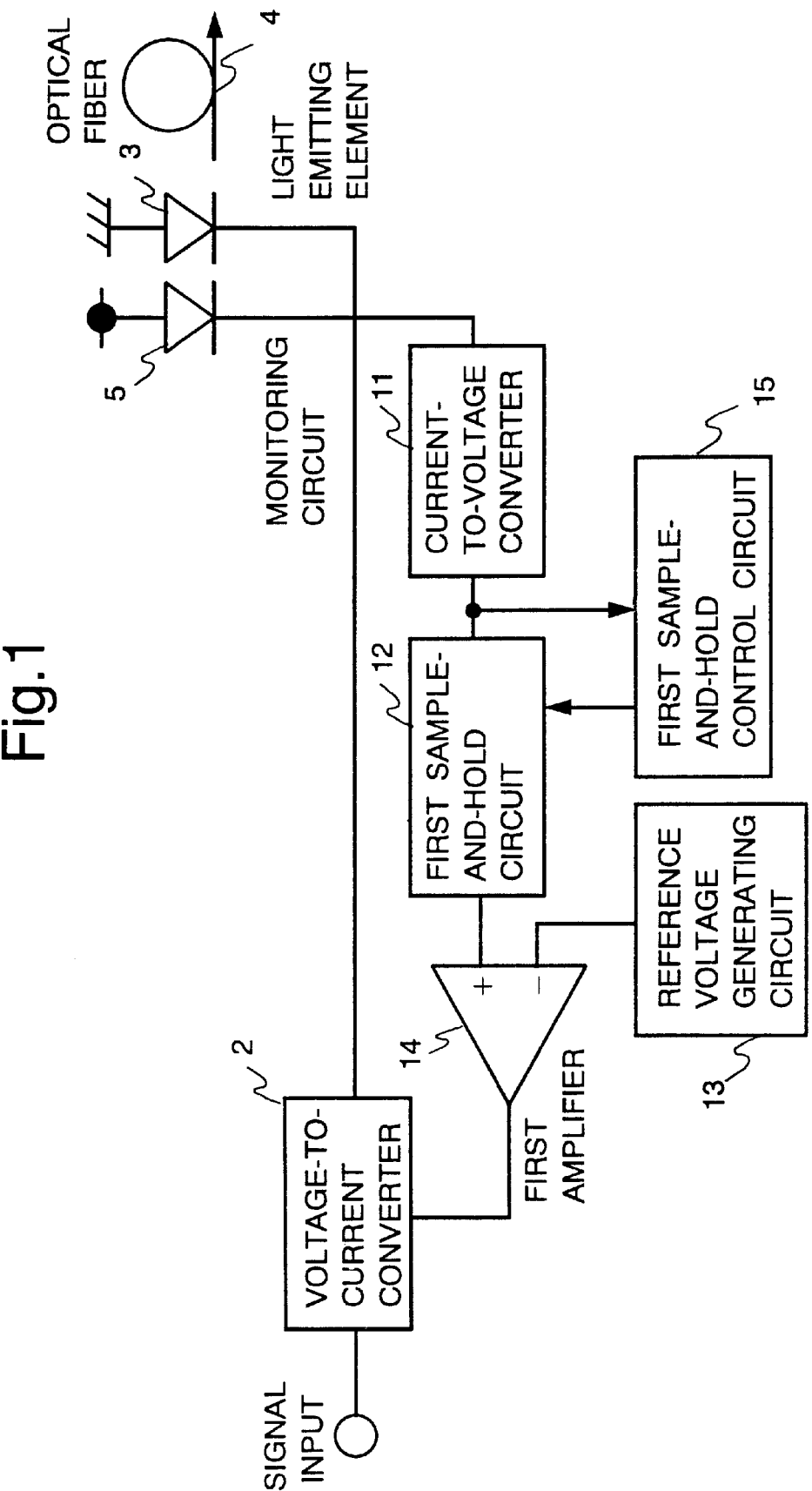
FIG. 1 is a block diagram of a light emitting control apparatus according to embodiment 1 of the present invention.
Figure 13:
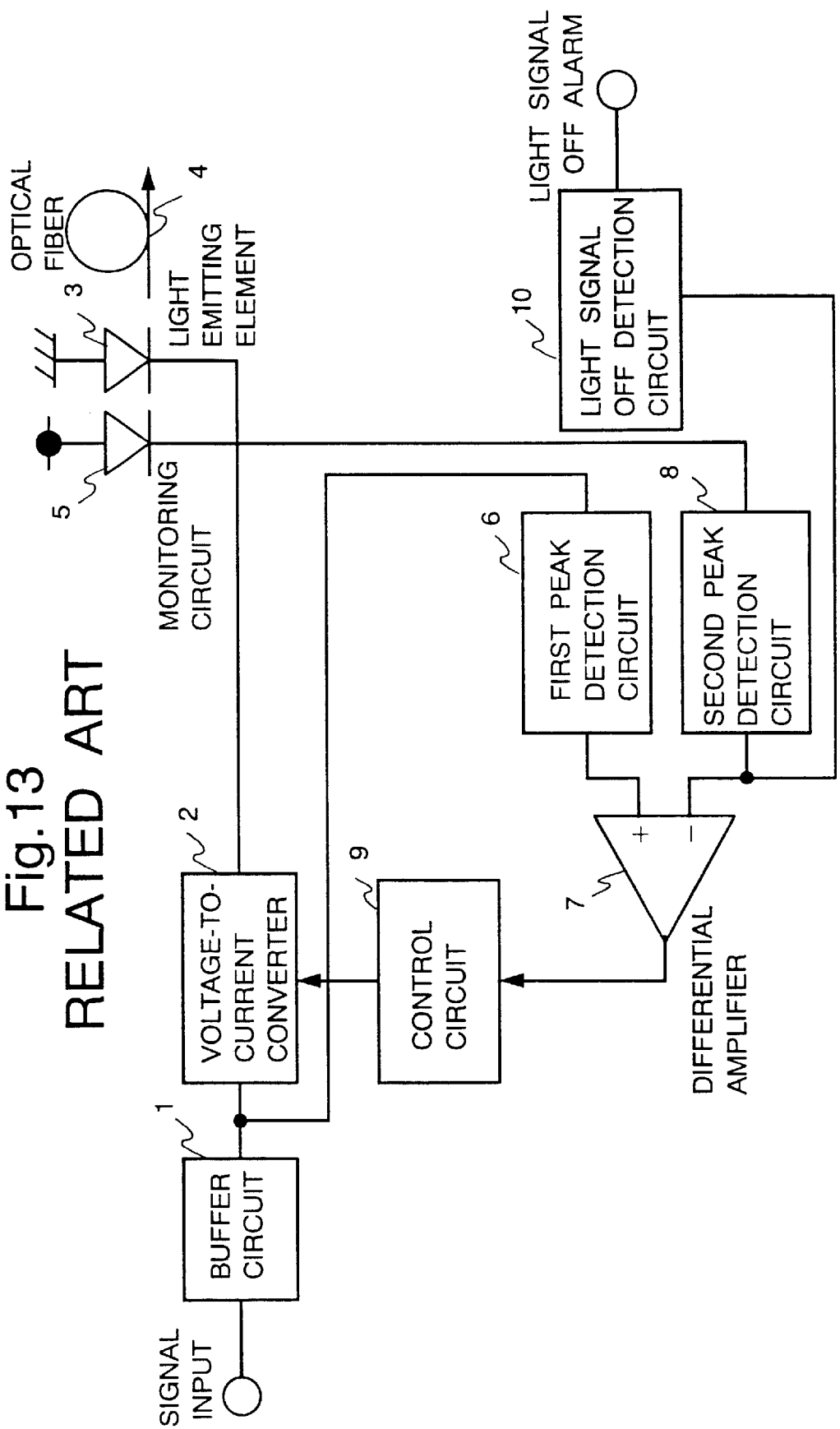
FIG. 13 is a block diagram of an optical power outputting apparatus according to the conventional related art of the present invention.

FIG. 1 illustrates a configuration of a light emitting control apparatus according to embodiment 1 of the present invention. In FIG. 1, the same reference numerals are assigned to the parts performing similar functions as in FIG. 13, and their description will be omitted. In FIG. 1, reference numeral 11 denotes a current-to-voltage converter, 12 denotes a first sample-and hold circuit, 13 denotes a reference voltage generating circuit, 14 denotes a first amplifier, and 15 denotes a first sample-and-hold control circuit.

Next, the operation of this embodiment of the present invention will be described.

The description will be made herein about the APC operation using a signal with high and low levels generated by the conversion of the output of the monitoring circuit of the light emitting element. The converted signal with high and low levels is used as a sample-and-hold control signal.

An input signal is input into the voltage-to-current converter 2 and is converted into a current signal which is turned on and off corresponding to the input electrical signal's on/off state. The output current of the voltage-to-current converter 2 drives the light emitting element 3 to output a light signal which is turned on and off. The light signal is then sent to the optical fiber 4.

A fraction of the output of the light emitting element 3 is converted into a current signal via the monitoring circuit 5 used in the monitoring operation. Then, the current signal is converted into a voltage signal via the current-to-voltage converter 11. The output of the current-to-voltage converter 11 is divided into two branched outputs, and one of the two branched outputs is input into the first sample-and-hold circuit 12, where a peak value is detected. A difference between this peak value and a reference voltage from the reference voltage generating circuit 13 is detected in the first amplifier 14. The first amplifier 14 adjusts the amplitude of the current from the voltage-to-current converter 2 to cancel the difference and keep the optical output of the light emitting element constant.

The other one of the two branched outputs of the current-to-voltage converter 11 is input into the first sample-and hold control circuit 15 as the sample-and-hold control signal. In the first sample-and-hold control circuit 15, by comparing the input with the reference voltage, for example, an electric current is drawn from the first sample-and-hold circuit 12 when the sample-and-hold control signal is significant or the optical output is in the mark state, designated "1", and the first sample-and-hold circuit is put into the sample mode. In other words, the first sample-and-hold circuit 12 tracks an input very quickly.

When the optical output is in the space state, designated "0", the electrical-current tracking of the first sample-and-hold circuit 12 is stopped, and the first sample-and-hold circuit 12 is put into the hold mode. A time constant for the hold mode may be selected arbitrarily. However, the time constant for the hold mode is usually determined to be large, thus stabilizing the output of the first sample-and-hold circuit 12. By means of the above-described operation, sample-and-hold control is performed for each bit of input data. The first sample-and-hold circuit 12 efficiently becomes responsive to a change of the input state, and the APC operation is performed rapidly.

EMBODIMENT 2

Figure 2:
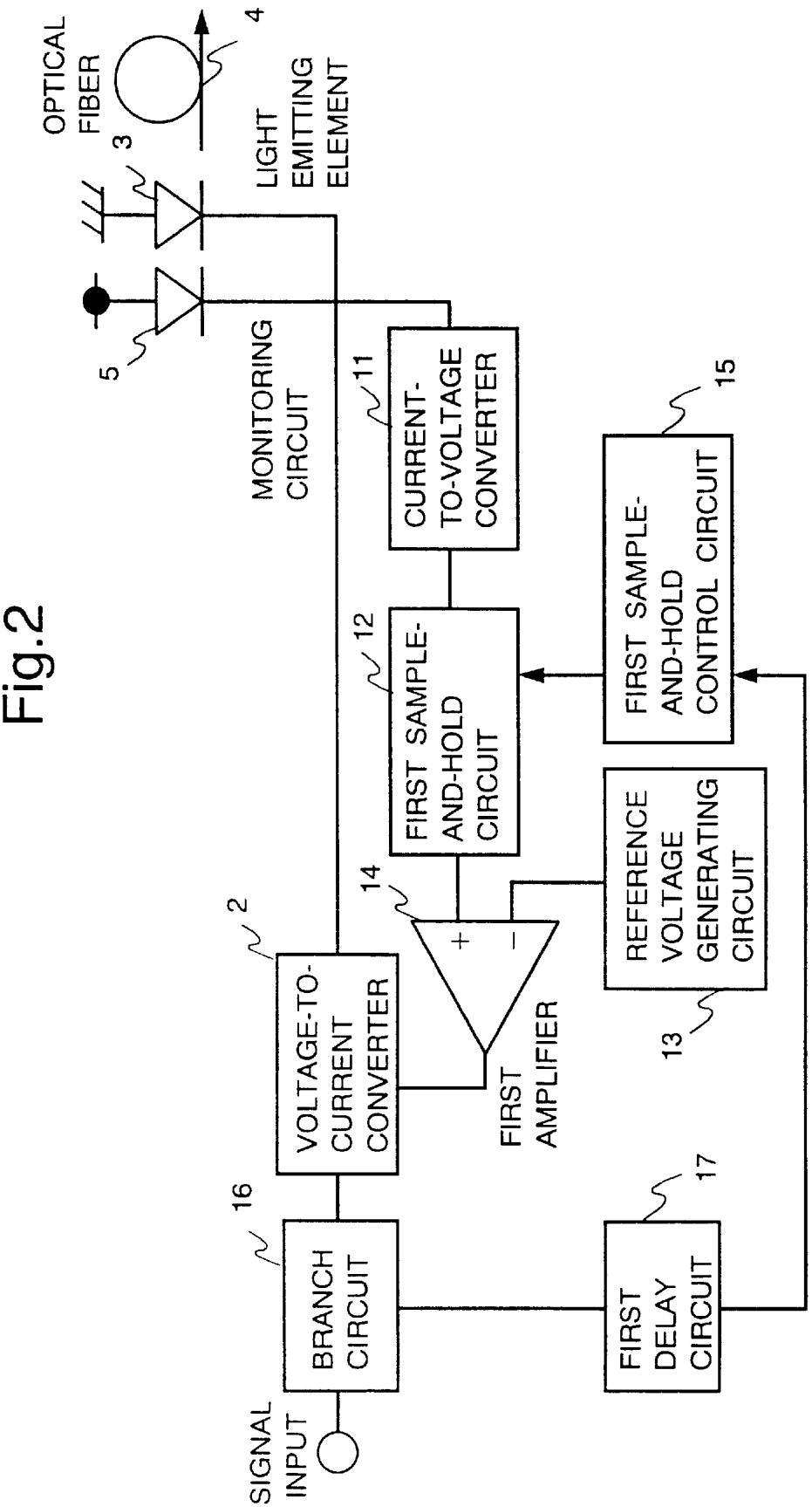
FIG. 2 is a block diagram of a light emitting control apparatus according to embodiment 2 of the present invention.

In conjunction with FIG. 2, this embodiment of the present invention describes the APC operation that is performed when the input signal is used as the sample-and-hold control signal. In FIG. 2, reference numeral 16 denotes a branch circuit, and 17 denotes a first delay circuit.

Now, the APC operation will be described.

The same APC operation as in embodiment 1 is performed, except that the sample-and-hold control signal is obtained from the input side of the light emitting control apparatus. An input signal is divided into two branched signals via the branch circuit 16. One of the two branched signals is input into the voltage-to-current converter 2, where it is converted into a current signal which is turned on and off corresponding to the input signal's on/off state. The output current of the voltage-to-current converter 2 drives the light emitting element 3 to output a light signal which is turned on and off and is sent to the optical fiber 4.

A fraction of the output of the light emitting element 3 is converted into a current signal via the monitoring circuit 5 used in the monitoring operation, and is further converted into a voltage signal via the current-to-voltage converter 11. The output of the current-to-voltage converter 11 is input into the first sample-and-hold circuit 12, where a peak value is detected. Then, in the first amplifier 14, a difference between this peak value and the reference voltage from the reference voltage generating circuit 13 is detected. The first amplifier 14 adjusts the amplitude of the current from the voltage-to-current converter 2 so as to cancel the difference between the peak and reference voltages and keep the optical output of the light emitting element constant.

The other one of the two branched signals outputted from the branch circuit 16, passes through the first delay circuit 17 and is input into the first sample-and-hold control circuit 15 as the sample-and-hold control signal. In the first sample-hold control circuit 15, when the input electrical signal is significant, or the optical output is designated "1", the sample-and-hold circuit 12 is put into the sample mode. When the optical output is designated "0", the first sample-and-hold circuit 12 is put into the hold mode.

In this situation, due to a time difference between light emission of the light emitting element 3 and conversion of the light signal into the electrical signal via the monitoring circuit 5, the sample-and-hold control signal is adjusted in its time-delay by the first delay circuit 17 so as to be in phase with the input into the first sample-and-hold circuit 12. Thus, by means of the above-described operation, sample-and-hold control is performed for each bit of input data, and the first sample-and-hold circuit 12 tracks the output from the monitoring circuit very quickly.

EMBODIMENT 3

In the embodiments described hereinbefore, control of the mark level of data was described.

In this embodiment of the present invention, an operation for reproducing the space level accurately by controlling the space level of data will be described.

Figure 3:
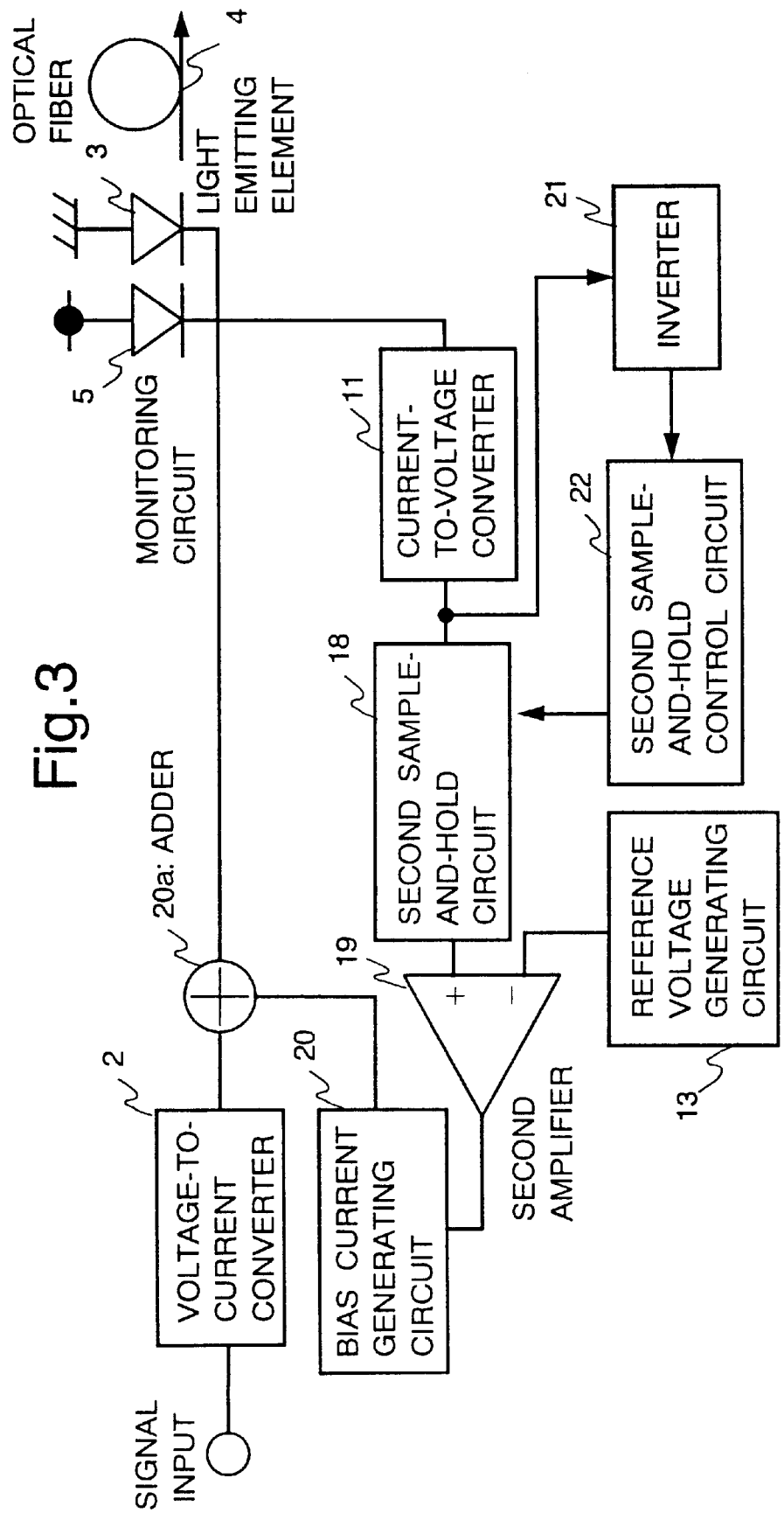
FIG. 3 is a block diagram of a light emitting control apparatus according to embodiment 3 of the present invention.

FIG. 3 depicts a light emitting control apparatus according to this embodiment of the present invention. In FIG. 3, reference numeral 18 denotes a second sample-and-hold circuit, 19 denotes a second amplifier, 20 denotes a bias current generating circuit, 21 denotes an inverter, and 22 denotes a second sample-and-hold control circuit.

Next, the operation of this embodiment will be described. The output of the monitoring circuit of the light emitting element is used as the sample-and-hold control signal.

Referring to the sample-and-hold operation and the feedback operation of the output from the monitoring circuit, similar operations to the operations in embodiment 1 are performed.

In this embodiment, the sample mode and the hold mode are inverted. Consequently, the sample-and-hold period is different from the previous embodiments. An input signal is input into the voltage-to-current converter 2, and is converted into a current signal which is turned on and off corresponding to the input signal's on/off state. The output current of the voltage-to-current converter 2 drives the light emitting element 3 to output a light signal which is sent to the optical fiber 4.

A fraction of the optical output of the light emitting element 3 is detected in the monitoring circuit 5, and is converted into a voltage signal via the current-to-voltage converter 11. The voltage signal is then input into the second sample-and-hold circuit 18. There, a peak value of the space level of data is detected, as will be described later. The peak value of the space level and the reference voltage from the reference voltage generating circuit 13 are compared in the second amplifier 19. The second amplifier 19 regulates the current for the bias current generating circuit 20 to cancel a difference between the peak value and the reference voltage, thus stabilizing a bias level when the input signal is in the space level.

The other one of the two branched outputs of the current-to-voltage converter 11 is inverted in its state via the inverter 21, and is input into the second sample-and-hold control circuit 22 as the sample-and-hold control signal In the second sample-and-hold control circuit 22, when the sample-and-hold control signal is significant, or the optical output is in the space state designated "0", the second sample-and-hold circuit 18 is put into the sample mode. When the optical output is in the mark state designated "1", the second sample-and-hold circuit 18 is put into the hold mode.

By means of the above-described operation, when data is in the space state designated "0", peak detection is executed, stabilizing the bias level when the input signal is in the space level. Thus, by adjusting the operation level for the space state of the data, reliability of the optical output for a circuit for a subsequent step of operation after having been transmitted through the optical fiber 4 can also be enhanced.

EMBODIMENT 4

Figure 4:
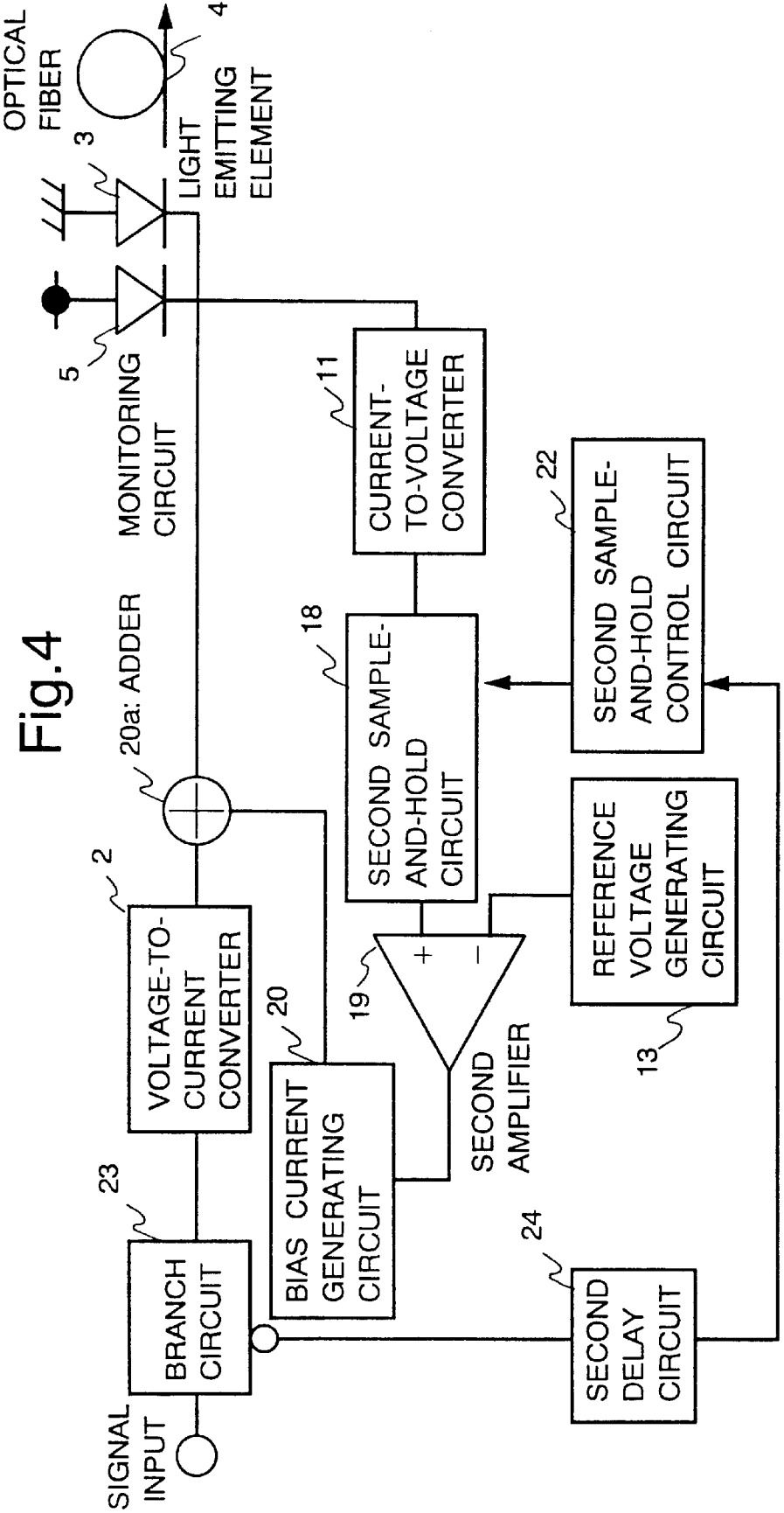
FIG. 4 is a block diagram of a light emitting control apparatus according to embodiment 4 of the present invention.

In conjunction with FIG. 4, this embodiment of the present invention describes a bias current control operation that is performed when the input signal is used the sample-and-hold control signal. In this embodiment, control of the space level of data is performed in the form of sample-and-hold control by means of the input signal as described in embodiment 2. In FIG. 4, reference numeral 23 denotes a branch circuit provided with an inversion output, and 24 denotes a second delay circuit.

The operation of this embodiment of the present invention will be described.

An input signal is divided into two branched signals via the branch circuit 23 provided with the inversion output. One of the two branched signals is input into the voltage-to-current converter 2 in its original state, and converted into a current signal which is turned on and off corresponding to the input electrical signal's on/off state. The output current of the voltage-to-current converter 2 drives the light emitting element 3 to output a light signal which is sent to the optical fiber 4.

A fraction of the output of the light emitting element 3 is detected in the monitoring circuit 5, and is converted into a voltage signal via the current-to-voltage converter 11. The voltage signal is then input into the second sample-and-hold circuit 18, where a peak value of the space level of data is detected. The peak value of the space level of data and the reference voltage from the reference voltage generating circuit 13 are compared in the second amplifier 19. The second amplifier 19 regulates the current for the bias current generating circuit 20 to cancel a difference between the peak value and the reference voltage, stabilizing the bias level when the input signal is in the space level. The bias current from the bias current generating circuit 20 is then added to the current from the voltage-to-current converter 2 via the adder 20a.

On the other hand, the other one of the two branched signals is inverted in its state upon outputted from the branch circuit 23, then passes through the second delay circuit 24, and is input into the second sample-and-hold control circuit 22 as the sample-and-hold control signal. In the second delay circuit 24, the sample-and-hold control signal is adjusted in its time-delay in the same manner as that in embodiment 2. In the second sample-and-hold control circuit 22, when the sample-and-hold control signal is significant, or the optical output is in the space state designated "0", the second sample-and-hold circuit 18 is put into the sample mode. When the optical output is designated "1", the second sample-and-hold circuit 18 is put into the hold mode.

By means of the above-described operation, when data is in the space state designated "0", peak detection is executed, thus, stabilizing the bias level when the input signal is in the space level.

EMBODIMENT 5

In this embodiment, a description will be given about a light emitting control apparatus comprised of circuits combining features of embodiment 1 and embodiment 3. Mark and space levels of data thus can be controlled, and the optical output with excellent reliability can be obtained.

Figure 5:
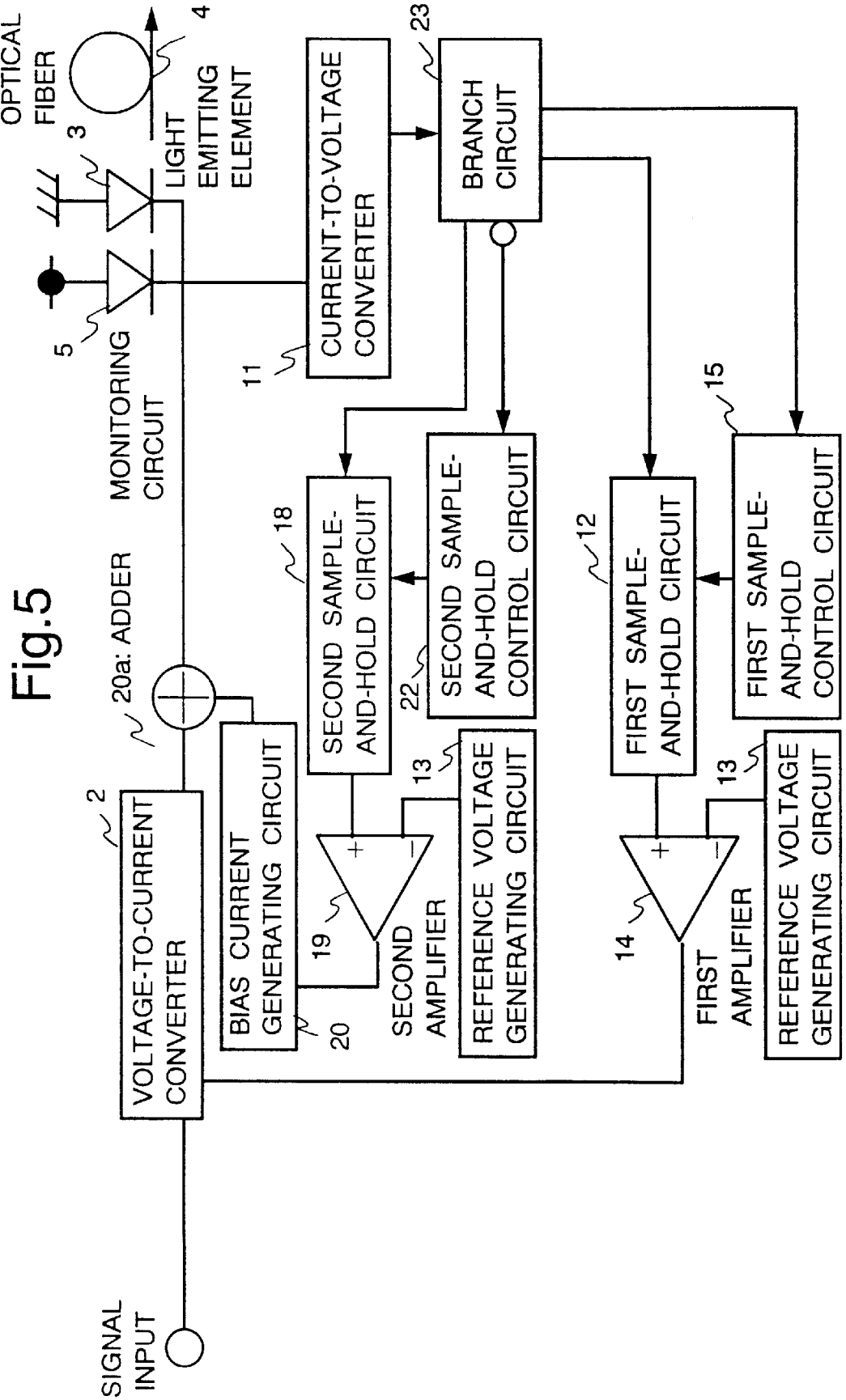
FIG. 5 is a block diagram of a light emitting control apparatus according to embodiment 5 of the present invention.

A light emitting control apparatus according to embodiment 5 of the present invention will be described in conjunction with FIG. 5. The output of the monitoring circuit of the light emitting element is used as the sample-and-hold control signal.

The operation will be performed in the same manner as that in the embodiments described hereinbefore. An input signal is input into the voltage-to-current converter 2, and is converted into a current signal. The output current of the voltage-to-current converter 2 drives the light emitting element 3 to output a light signal which is sent to the optical fiber 4.

An operation for controlling the bias current used to stabilize the input signal while in the space level will be described now.

A fraction of the output of the light emitting element 3 is detected in the monitoring circuit 5, and is converted into a voltage signal via the current-to-voltage converter 11. The output of the current-to-voltage converter 11 is divided into four branched outputs via the branch circuit 23. One of the four branched outputs is input into the second sample-and-hold circuit 18 in its original state, and as will be described later, a peak value of the space level of data is detected. The peak value of the space level and the reference voltage from the reference voltage generating circuit 13 are compared in the second amplifier 19. The second amplifier 19 regulates the current for the bias current generating circuit 20 so as to cancel a difference between the peak value of the space level of data and the reference voltage, stabilizing the bias level when the input signal is in the space level. The bias current from the bias current generating circuit 20 is then added to the current from the voltage-to-current converter 2 via the adder 20a.

On the other hand, another one of the four branched outputs from the branch circuit 23 is inverted in its state, and is input into the second sample-and-hold control circuit 22 as the sample-and-hold control signal. In the second sample-and-hold control circuit 22, when the sample-and-hold control signal is significant, or the optical output is in the space state designated "0", the second sample-and-hold circuit 18 is put into the sample mode. When the optical output is designated "1", the second sample-and-hold circuit 18 is put into the hold mode. By means of the above-described operation, when data is in the space state designated "0", peak detection is executed, thus stabilizing the bias level when the input signal is in the space level.

Next, the APC operation will be described.

Another one of the four branched outputs from the above-described branch circuit 23 is input into the first sample-and-hold circuit 12 in its original state, and a peak value is detected. A difference of the peak value and the reference voltage from the reference voltage generating circuit 13 is detected in the first amplifier 14. In the first amplifier 14, the amplitude of the current from the voltage-to-current converter 2 is adjusted so as to cancel the difference and keep the optical output of the light emitting element constant.

The last one of the four branched outputs of the branch circuit 23 is input into the first sample-and-hold control circuit 15 as the sample-and-hold control signal. In the first sample-and-hold control circuit 15, when the sample-and-hold control signal is significant, or the optical output is designated "1", the first sample-and-hold circuit 12 is put into the sample mode. When the optical output is designated "0", the first sample-and-hold circuit 12 is put into the hold mode.

By means of the above-described operation, sample-and-hold control is performed for each bit of input data corresponding to the low and high levels of the input signal, and the first sample-and-hold circuit 12 tracks the output from the monitoring circuit very quickly. Furthermore, the bias current when the input signal is in the space level is controlled in a stable fashion.

EMBODIMENT 6

Next, in conjunction with FIG. 6, another embodiment of the present invention showing a combined operation of bias current control and the APC operation will be described. Herein, the description will only be directed to a difference between embodiment 5 and embodiment 6. The input signal is used as the sample-and-hold control signal.

Figure 6:
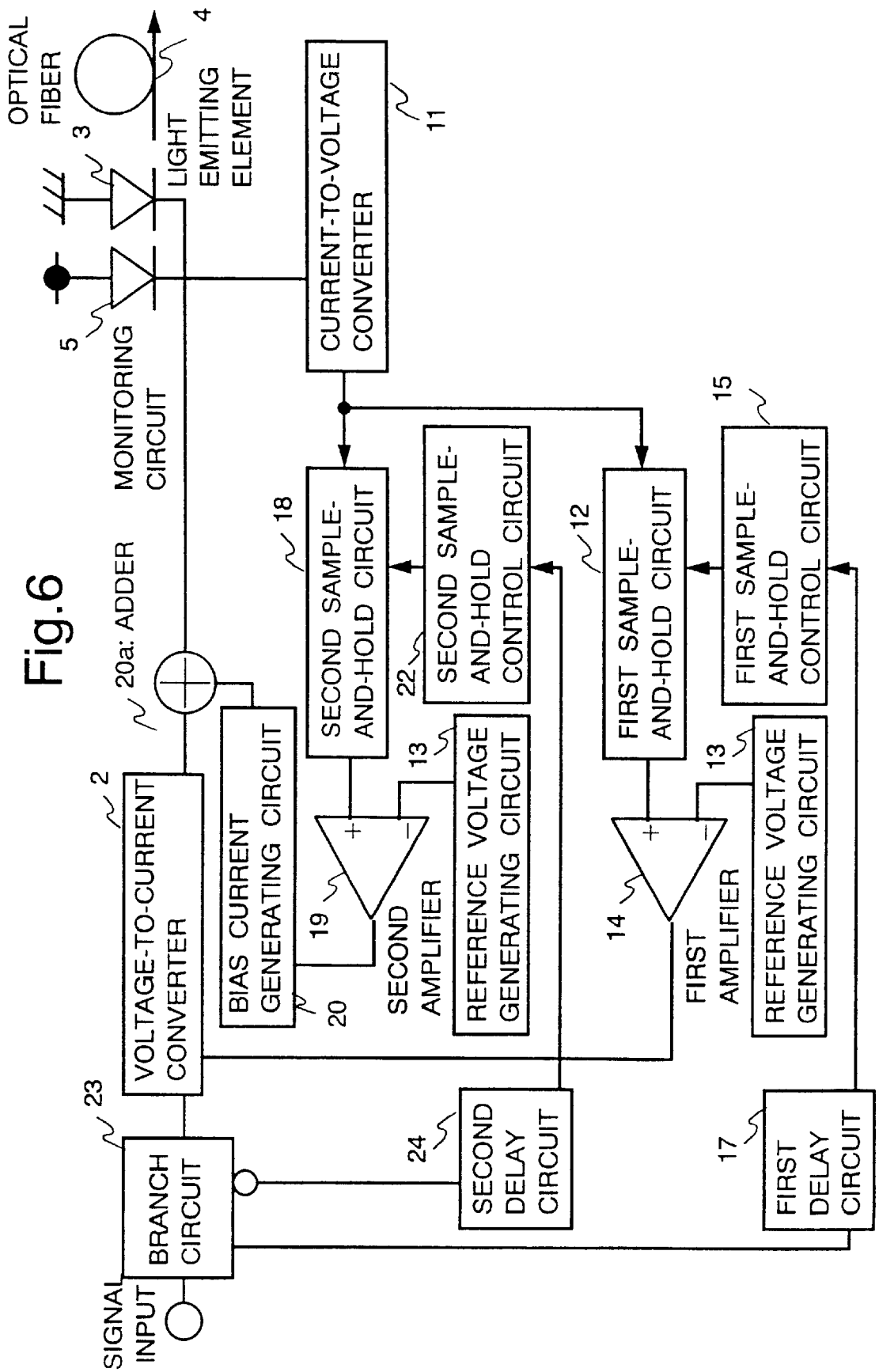
FIG. 6 is a block diagram of a light emitting control apparatus according to embodiment 6 of the present invention.

In FIG. 6, the input signal is branched into three branched signals via the branch circuit 23. One of the three branched signals is input into the voltage-to-current converter 2 in its original state. The other one of the three branched signals, also in its original state, is input into the first sample-and-hold control circuit 15, after having been adjusted in its time delay via the first delay circuit 17. The last one of the three branched signals is input into the second sample-and-hold control circuit 22, after having been inverted in its state by the branch circuit 23 and adjusted in its time delay by the second delay circuit 24.

The output of the monitoring circuit 5 is divided into two branched outputs after having been subjected to current-to-voltage conversion by the current-to-voltage converter 11. One of the two branched outputs is input into the first sample-and-hold circuit 12, and the other is input into the second sample-and-hold circuit 18. Then, a peak level detection and a space level detection are executed. Other operations are the same as in embodiment 5, and the APC operation and the bias current control operation are performed.

EMBODIMENT 7

Figure 7:
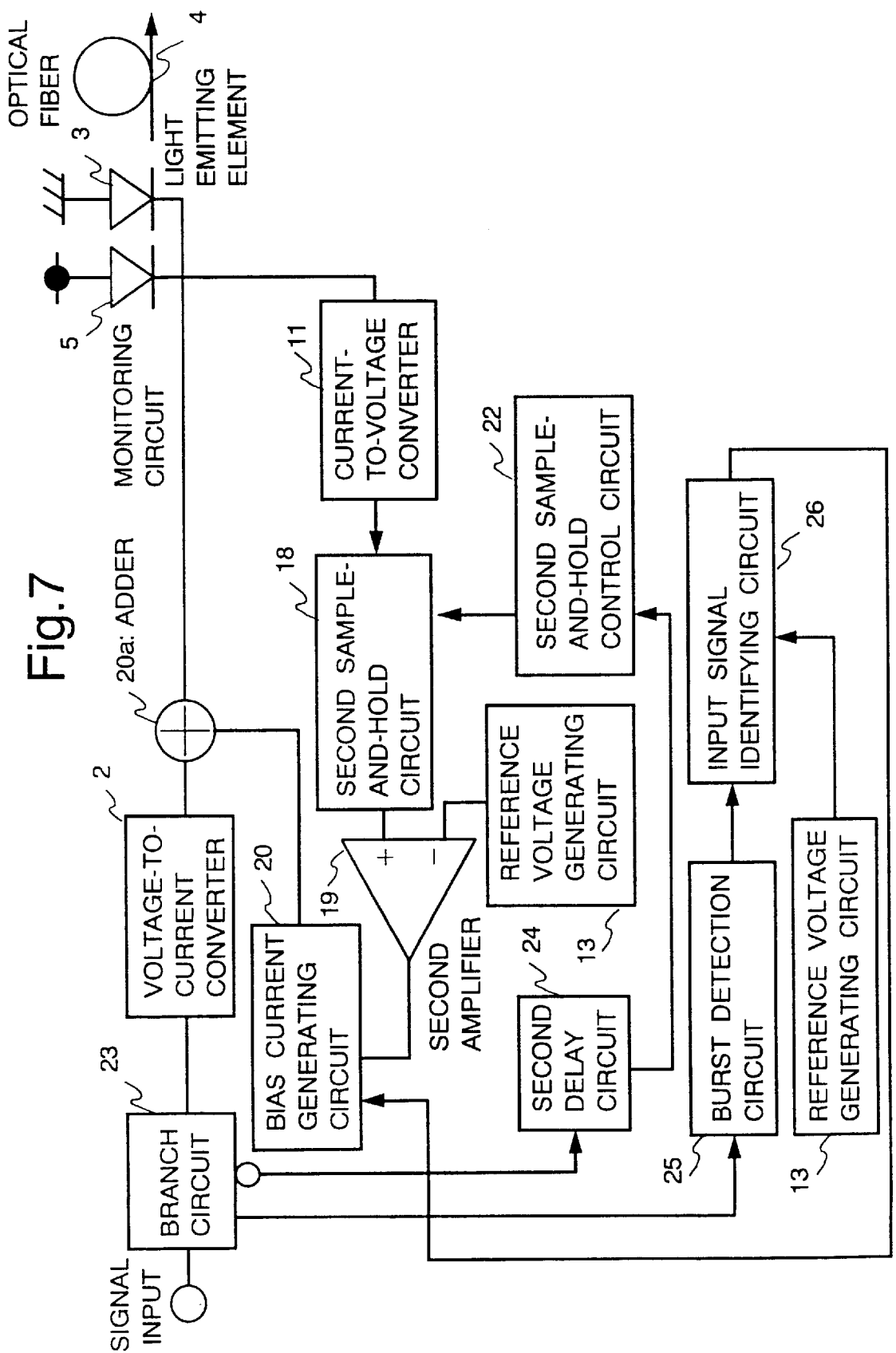
FIG. 7 is a block diagram of a light emitting control apparatus according to embodiment 7 of the present invention.

In this embodiment, a description will be directed to the case where the sample-and-hold control period is defined to be a period in which the input signal continues to be input in bursts. Thereby, another embodiment of the bias current control operation will be described in conjunction with FIG. 7. In FIG. 7, reference numeral 25 denotes a burst detection circuit, and 26 denotes an input signal identifying circuit.

The configuration of the burst detection circuit 25 is the same as that of the first sample-and-hold circuit 12 or the second sample-and-hold circuit 18. However, the time constant for the hold operation is small, and thus falls off to a "0" level as the space state of data continues for more than a predetermined period of time. The time constant may be set to an arbitrary value. Let us assume, for example, that the time constant is set to fall off to 0 when a period of 15 consecutive space states elapses. When the mark state of data input is present within that period, the burst detection circuit detects it as a signal input in bursts.

The operation of this embodiment will be described.

Here, the description will be directed only to the case where the input signal is used as a signal for controlling the second sample-and-hold circuit 22. Referring to the case where the output of the monitoring circuit of the light emitting element is used as the sample-and-hold control signal, the description has already been given in above-described embodiments. Therefore, the description about that in this case will be omitted.

An input signal is divided into three branched signals via the branch circuit 23. One of the three branched signals is input into the voltage-to-current converter 2 in its original state. The other one of the three branched signals is inverted in its state within the branch circuit 23, and is input into the second sample-and-hold circuit 18 after being time delayed, and bias current control is performed as described in embodiment 4.

On the other hand, the last one of the three branched signals is input into the burst detection circuit 25, where a peak value is detected. The peak value is compared with the reference voltage in the input signal identifying circuit 26, and the presence of the signal input is identified. As described before, when the space state continues for more than a predetermined period, it is determined that there is no signal input. The output of the input signal identifying circuit 26 is input into the bias current generating circuit 20. When no signal input has been input for a long time, the bias current passing through the light emitting diode is cut off.

EMBODIMENT 8

Next, a description of an embodiment of the present invention will be given about a circuit for detecting a failure of the optical transmitter apparatus in which no optical output is produced by the light emitting element 3 even if an input signal is present.

Figure 8:
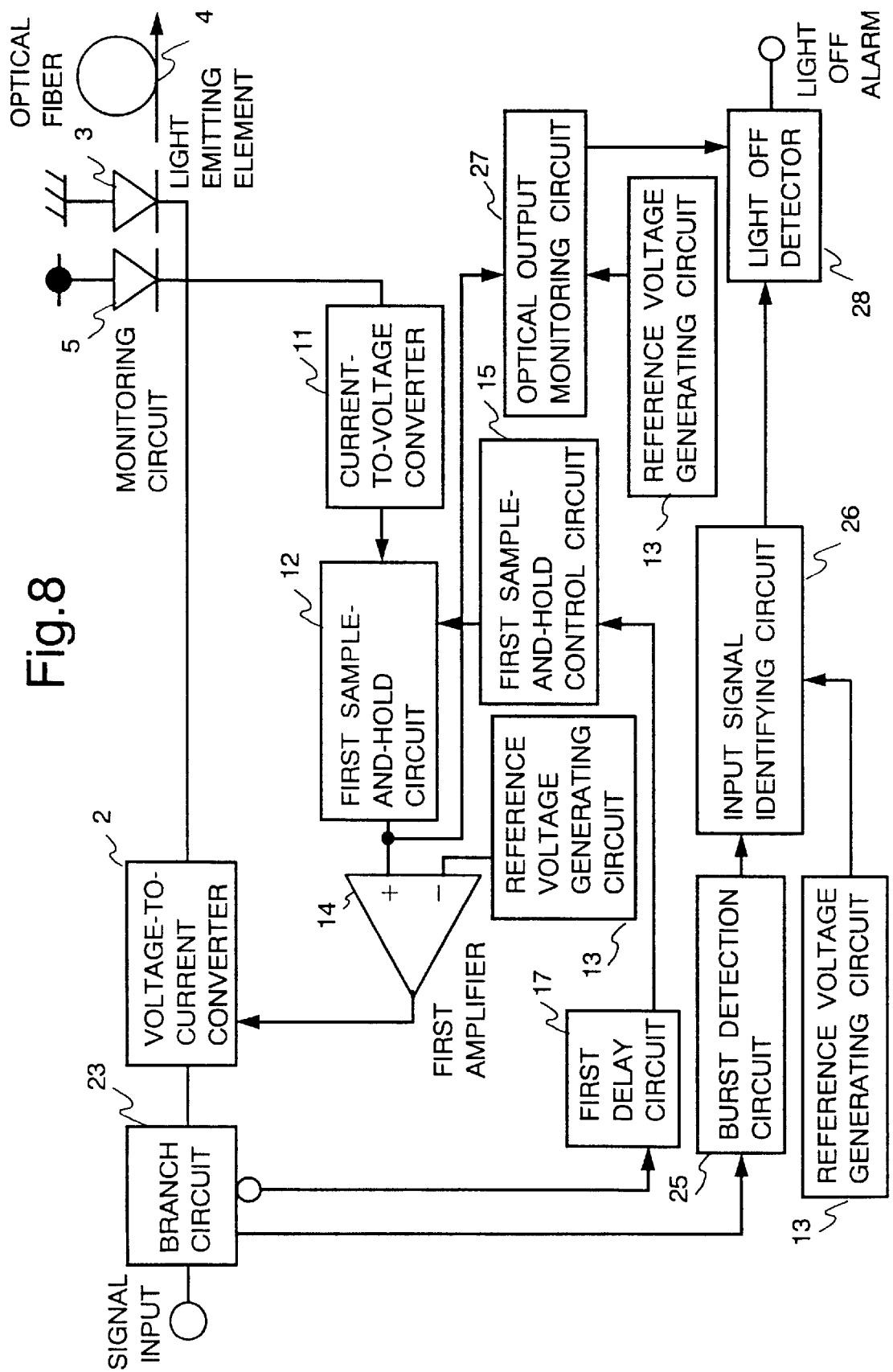
FIG. 8 is a block diagram of a light emitting control apparatus according to embodiment 8 of the present invention.

In conjunction with FIG. 8, this embodiment of the present invention describes optical output off detection. In FIG. 8, reference numeral 27 denotes an optical output monitoring circuit, and 28 denotes a light off detector.

The output of the first sample-and-hold circuit 12 is branched into two branched outputs. One of the two branched outputs is input into the first amplifier 14, and the other one is input into the optical output monitoring circuit 27. In the optical output monitoring circuit 27, the output of the first sample-and-hold circuit 12 and the reference voltage from the reference voltage generating circuit 13 are compared, and the presence of the optical output is determined according to a predetermined reference value. When it is determined that no optical output is present in the optical output monitoring circuit 27, and that an input signal is being input into the optical transmitter via the input signal identifying circuit 26, the light off detector 28 generates a light off alarm signal.

By means of the above-described operation, a light off alarm is generated only in the case of the failure of the optical transmitter. In other words, a light off alarm is not generated except in the case of the failure of the optical transmitter. Therefore, when a system provided with the optical transmitter according to the present invention detects an error, a part failure can be identified easily. Such a complex operation as previously described in the conventional related art, performed by combining gate circuits to identify an alarm-causing failure part is not needed.

EMBODIMENT 9

The configuration of the sample-and-hold circuit including the sample-and-hold control circuit is rather complicated. However, the sample-and-hold circuit has the following characteristics:

The input impedance of the circuit is high enough not to affect other circuits.

When the sample-and-hold circuit is in the sample mode, the internal impedance of the circuit is high, and the circuit is excellent in the following property.

When the sample-and-hold circuit is in the hold mode, the circuit retains the voltage level of the sample mode if the load impedance of the circuit connected thereto is not so low.

Figure 9:
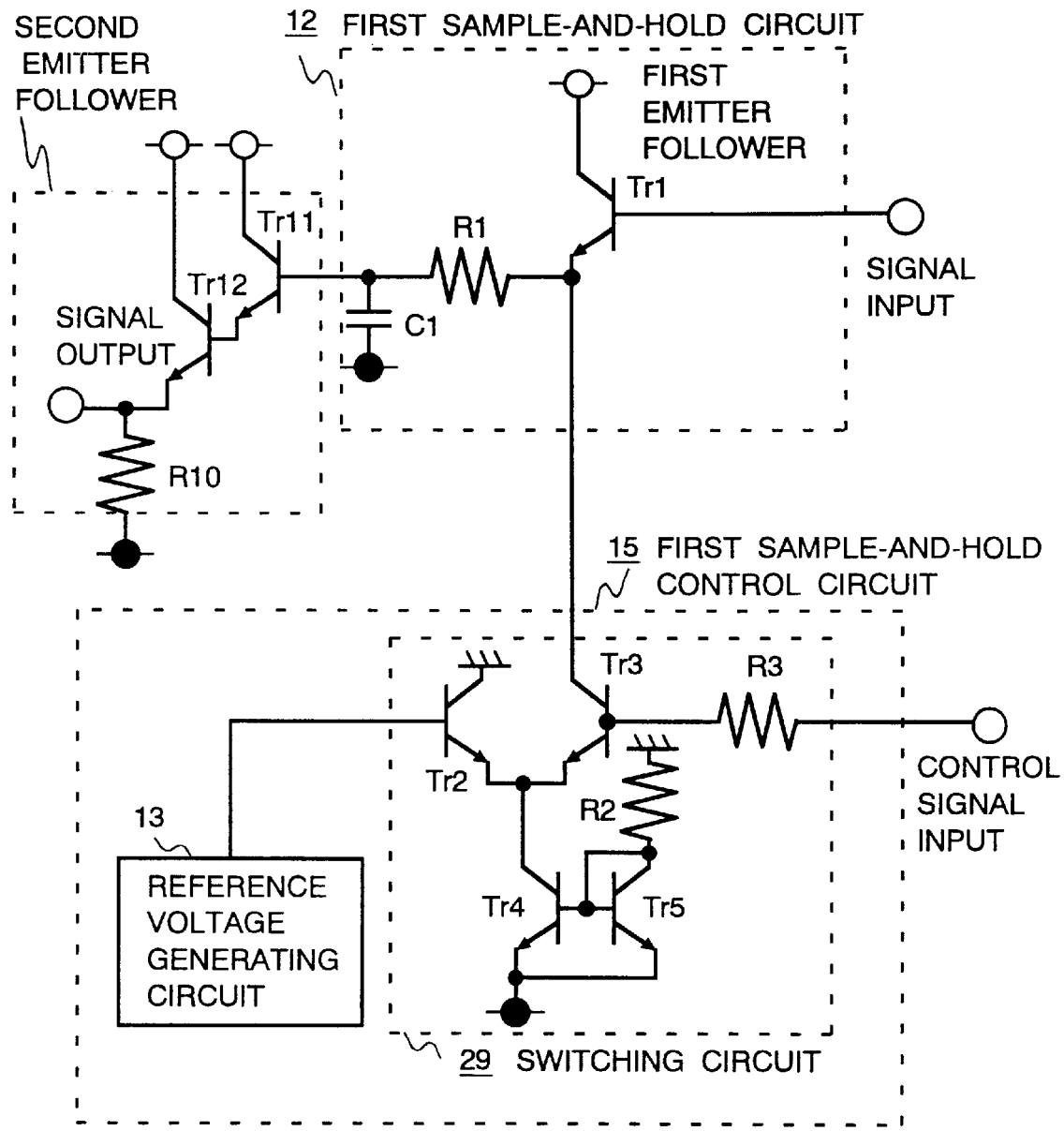
FIG. 9 is a circuit diagram showing an embodiment of the first sample-and-hold circuit and the first sample-and-hold control circuit according to the present invention.

There are various circuit configurations for the sample-and-hold circuit. In this embodiment, a description will be directed to the circuit configuration for the first sample-and hold circuit 12 and the first sample-and-hold control circuit 15 shown in FIG. 9. Refer to previous drawings for references made to elements such as the monitoring circuit which have been left out of this drawing. In the present embodiment, the sample-and-hold control signal is generated by the conversion of the output of the monitoring circuit into a signal with high and low levels. In FIG. 9, reference numeral 29 denotes a switching circuit, TrXX denotes a transistor, CXX denotes a capacitor, and RXX denotes a resistance. (herein, XX represents numerals.)

Now, the operation of this embodiment will be described. The output of the current-to-voltage converter 11 is divided into two branched outputs. One of the two branched outputs is input into the first sample-and-hold circuit 12. As shown in FIG. 9, the first sample-and-hold circuit 12 is comprised of a transistor Tr1, a resistance R1, and a capacitor C1. The transistor Tr1 constitutes a first emitter follower. The other one of the two branched outputs of the current-to-voltage converter 11 is converted in its voltage level and input into the first sample-and-hold control circuit 15 as the control signal input and is used by the switching circuit 29 as the input for controlling the first sample-and-hold control circuit 15. The first sample-and-hold control circuit 15 is comprised of the switching circuit 29 and the reference voltage generating circuit 13. In the switching circuit 29, the input for controlling the first sample-and-hold control circuit 15 and the reference voltage are compared. When the input for controlling the first sample-and-hold control circuit 15 (the input into a transistor Tr3) is significant, or the optical output is in the mark state, the transistor Tr3 is turned ON. Then, the first sample-and-hold circuit 12 is put into the sample mode.

When an electric charge of the capacitor C1 in the first sample-and-hold circuit 12 is small, the capacitor C1 is charged up. A time constant Tc for charging the capacitor C1 is determined by the value of the resistance R1 and the capacitor C1 as shown in the following expression.

$Tc = R1 \cdot C1$

When the electric charge of C1 is large and the emitter voltage of the transistor Tr1 is larger than the base voltage, the transistor Tr1 is put into the OFF state. Then, the transistor Tr3 receives an electric charge from the capacitor C1 so as to discharge the capacitor C1. A time constant Td1 for discharging the capacitor C1 is determined by an electric charge Q1 accumulated in the capacitor C1 and a collector current Icollector of the transistor Tr3.

$Td1 = Q1 / Icollector$

When the optical output is in the space state, a transistor Tr2 is turned ON, and the transistor Tr3 is turned OFF. The first sample-and-hold circuit 12 is then put into the hold mode. In this situation, a time constant Td2 for discharging the capacitor C1 is determined by the electric charge Q2 accumulated in the capacitor C1 and the current Iout flowing through the output side of the first sample-and-hold circuit 12.

$Td2 = Q2 / Iout$

Transistors Tr11 and Tr12 and a resistance R10 constitute a second emitter follower. By constituting a Darlington circuit by means of the transistor Tr11 and the transistor Tr12 and connecting it to the capacitor C1 as shown in FIG. 9, the current Iout can be held to be almost one hundredth of the value obtained by an usual emitter follower. In this situation, the current Iout can be held to several tens of nanoamperes. When the capacitor C1 has a capacitance of 1000 pF and is charged with a voltage of 0.5 V, the time constant for discharging the capacitor C1 becomes as large as 50 ms.

As described above, when the sample-and-hold circuit is in the sample mode, time constants for charging and discharging the capacitor can be varied with the rate of the signal to be transmitted. Accordingly, the APC operation can be accomplished rapidly. When the sample-and-hold circuit is in the hold mode, the time constant for discharging the capacitor can be set to be large by constituting and connecting the Darlington circuit to the sample-and-hold circuit. After a signal has been input in short bursts for a long period, and once the APC operation has been accomplished, optical output variation which would occur at the beginning of the subsequent signal input in bursts can be suppressed even if the idle time therebetween is long.

EMBODIMENT 10

Figure 10:
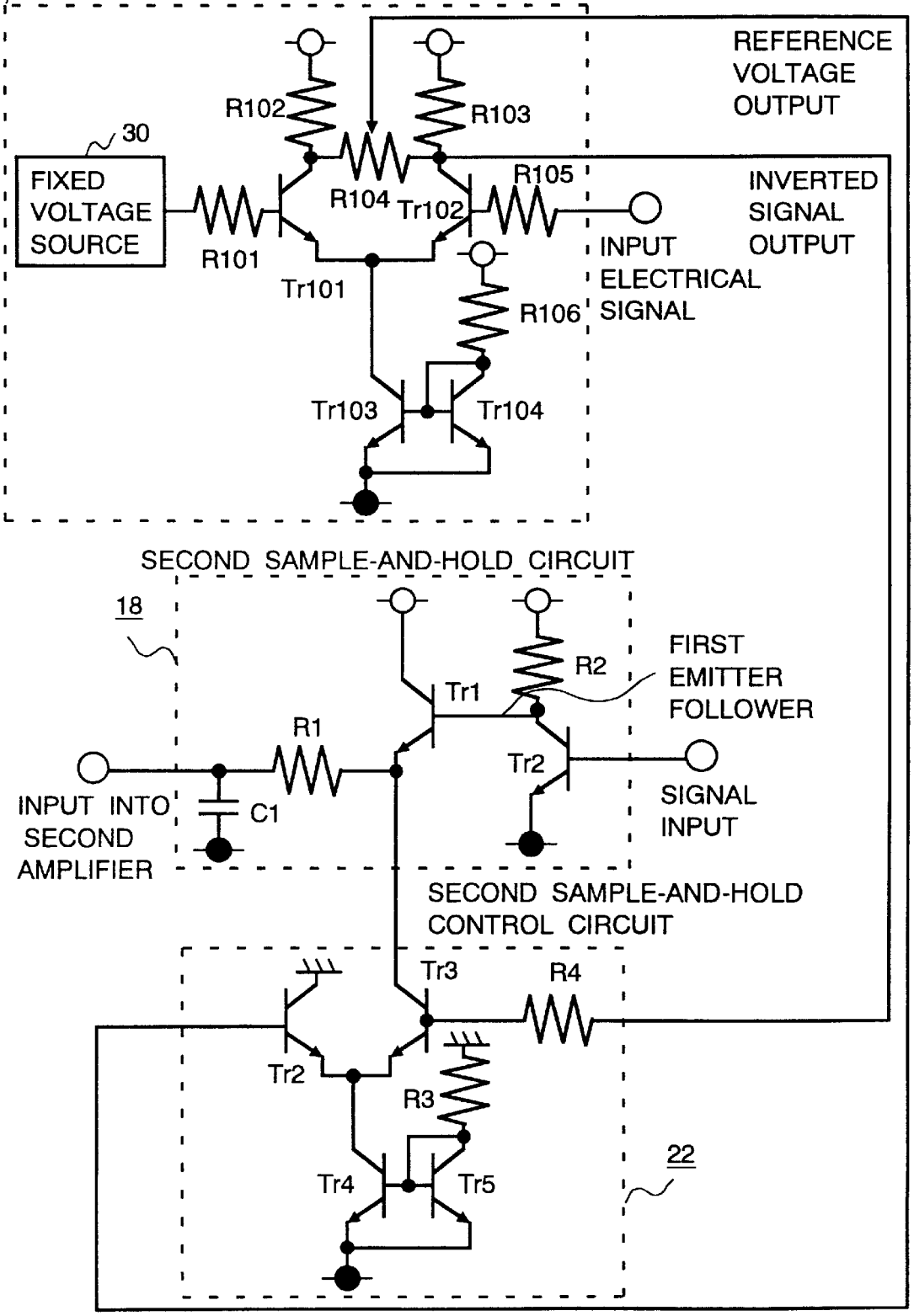
FIG. 10 is a circuit diagram showing an embodiment of the second sample-and-hold circuit and the second sample-and-hold control circuit according to the present invention.

Next, in conjunction with FIG. 10, a description will be given about an embodiment of the circuit configuration required for executing peak detection of the optical output when data is in the space state.

The second sample-and-hold circuit 18 is turned on/off by the second sample-and-hold control circuit 22. In this embodiment, the input into the second sample-and-hold control circuit 22 is inverted so as to facilitate detection of the space level of data by inverting mark and space levels.

An inverter and reference voltage generating circuit 31 is provided to provide the functions of inverting a signal input as well as providing a reference voltage. A fixed voltage source 30, and a second differential circuit constituted by the transistor Tr101 and the transistor 102 are provided within the inverter and reference voltage generating circuit 31. An input electrical signal is inverted in its state via the differential circuit and outputted to the second sample-and-hold control circuit 22 as the sample-and-hold control signal. In the inverter and reference voltage generating circuit 31, a reference voltage is derived from a midpoint value of two outputs from the differential circuit and outputted to the second sample-and-hold control circuit 22. Thus, when differential output levels fluctuate according to temperature changes, the reference voltage, which represents the midpoint value of two outputs from the differential circuit, also changes. The reference voltage thus changes and remains in the middle range between the high level and the low level of data at all times.

The above-described sample-and-hold control signal and reference voltage are input into the second sample-and-hold control circuit 22. The sample-and-hold control signal has been inverted in its state. Consequently, in the second sample-and-hold control circuit 22, when data is in the space state, the transistor Tr3 is turned ON by the inverted sample-and-hold control signal and the second sample-and-hold circuit 18 is put into the sample mode. Then, the capacitor C1 is charged up, and peak detection of the space level of data is executed. When data is in the mark state, the transistor Tr2 is turned ON. Thus, the transistor Tr1 and the transistor Tr3 are turned OFF. The second sample-and-hold circuit 18 is then put into the hold mode to retain the detected peak value of the space level of data.

Since the bias current for the light emitting element is controlled by detection of the space level of the optical output (when the input signal is in the space level), an ideal transmission waveform can be obtained.

By means of the above-described operation, peak detection of the space level of the optical output becomes possible.

Referring to peak detection of the mark level of data, the inverter and reference voltage generating circuit 31 constituted by the transistors Tr101, Tr102, Tr103, and Tr104 may be used to avoid the influence of such factors as temperature variations. In this case, an in-phase signal responsive to the mark level of data is used as the sample-and-hold control signal, and when peak detection of the mark level of data is executed, the in-phase signal is outputted from the collector of the transistor Tr101. The output from the inverter and reference voltage generating circuit 31 can also be used to provide the reference voltage for the amplifier.

EMBODIMENT 11

Figure 11:
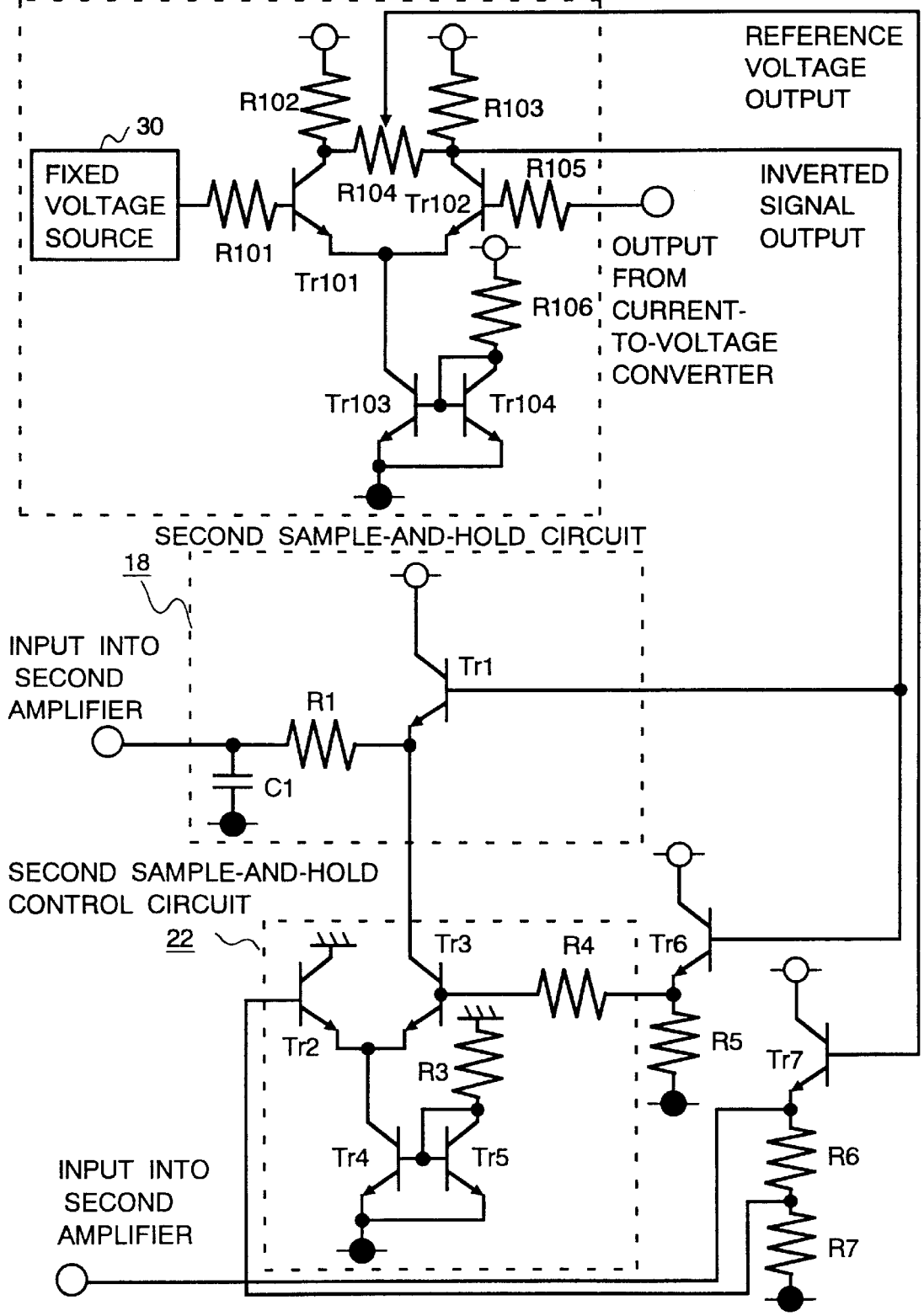
FIG. 11 is a circuit diagram showing an embodiment of the second sample-and-hold circuit and the second sample-and-hold control circuit according to the present invention.

Next, in conjunction with FIG. 11, a description will be given about another embodiment of the circuit configuration required for executing peak detection of the optical output when data is in the space state.

It is assumed herein that the output of the current-to-voltage converter 11, into which the optical-output-monitoring signal of the monitoring circuit 5 is input, is used as the input signal into the inverter and reference voltage generating circuit 31.

In the inverter and reference voltage generating circuit 31, the output of the current-to-voltage converter 11 is input into the differential circuit therein, and inverted in its state. Then the inverted signal is input into the second sample-and-hold control circuit 22 via the emitter follower and the second sample-and-hold circuit 18. The output of the midpoint value between two outputs from the differential circuit within the inverter and reference voltage generating circuit 31 is input into the second amplifier 19 via the other emitter follower as the reference voltage, and also input into the second sample-and-hold control circuit 22 after having been converted in its voltage level.

The output of the current-to-voltage converter circuit 11 is inverted in its mark and space levels via the inverter and reference voltage generating circuit 31. Thus, in the second sample-and-hold control circuit 22, when data is in the space state, the transistor Tr3 is turned ON. The second sample-and-hold circuit 18 is then put into the sample mode, the capacitor C1 is charged up, and peak detection of the space level of data is executed. When data is in the mark state, the transistor Tr2 is turned ON, and the transistors Tr1 and Tr3 are turned OFF. The second sample-and-hold circuit 18 is then put into the hold mode, and the detected peak value of the space level of data is retained.

By means of the above-described operation, peak detection of the space level of the optical output becomes possible.

EMBODIMENT 12

In a light emitting power control apparatus which is quickly responsive to an input, when a signal is input after no signal has been input for a long time, the optical output becomes large due to an excess gain obtained. In this embodiment of the present invention, in conjunction with FIG. 12, a light emitting power control apparatus for overcoming the above-mentioned disadvantage and suppressing the APC gain for an input signal will be described.

Figure 12:
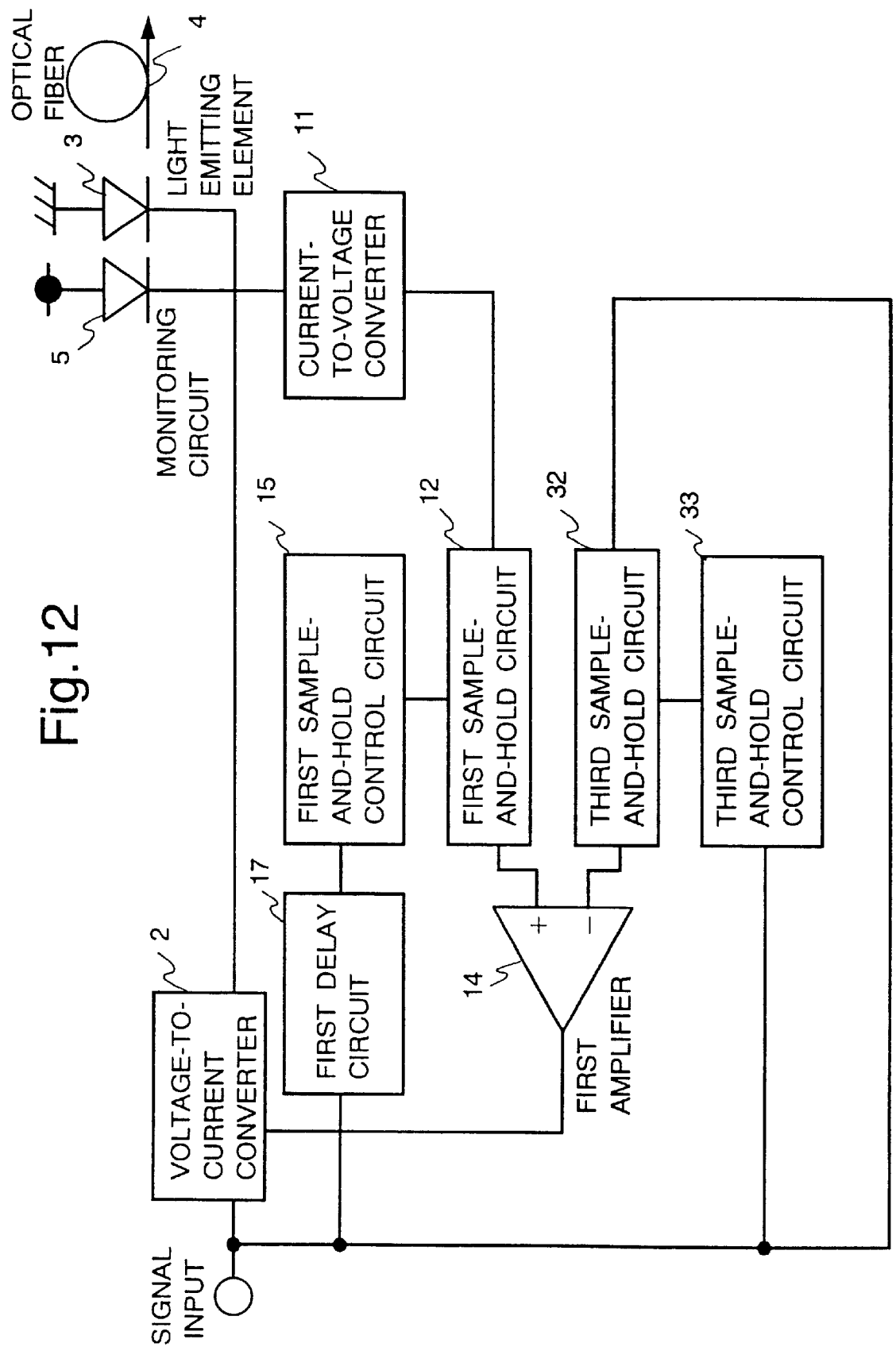
FIG. 12 is a block diagram showing an embodiment of a light emitting control apparatus in the APC operation.

In FIG. 12, reference numeral 32 denotes a third sample-and-hold circuit, and reference numeral 33 denotes a third sample-and-hold control circuit.

In this embodiment, a description will be directed to the APC operation which keeps an optical output rise from exceeding a predetermined set value at the beginning of the signal input in bursts.

In this embodiment, the input signal is used as the sample-and-hold control signal. The operation of the first sample-and-hold circuit 12 and the first sample-and-hold control circuit 15 has been described hereinbefore. Therefore, the description about the operation will be omitted. The operation of the third sample-and-hold circuit 32 is performed in a similar manner to that of the first sample-and-hold circuit 12. Thus, the description about the operation will also be omitted.

Now, the APC operation in this embodiment will be described. An input signal is divided into four branched signals. One of the four branched signals is input into the third sample-and-hold circuit 32. In the third sample-and-hold circuit 32, peak detection of the input signal is executed by the sample-and-hold control signal from the third sample-and-hold control circuit 33. In the first sample-and-hold circuit 12, peak detection of the optical output is executed by the sample-and-hold control signal from the first sample-and-hold control circuit 15.

When no signal is input, a detected peak value in the third sample-and-hold circuit 32 is zero. Since no optical output is provided, a detected peak value in the first sample-and-hold circuit 12 also becomes zero. Accordingly, in the first amplifier 14, a difference between the peak values of the first sample-and-hold circuit 12 and the third sample-and-hold circuit 32 is not detected. In this situation, the current gain of the voltage-to-current converter 2 becomes zero.

When an input signal is input, it is divided into four branched signals. One of the four branched signals is input into the voltage-to-current converter 2, and another one of the four branched signals is input into the third sample-and-hold circuit 32. Now, let us assume that the time constant for charging the third sample-and-hold circuit 32 has been set to be from two to twenty bits of an input signal. A detected peak value in the third sample-and-hold circuit 32 thereby increases gradually. Now, the detected peak value is input into the first amplifier 14 as the reference voltage. Then, the current gain of the voltage-to-current converter 2 increases gradually, and the optical output rises gradually from the beginning of the signal input in bursts. When the reference voltage is set to be a predetermined value and no signal is being input, the reference voltage and the peak value of a zero level of the optical output are compared in the first amplifier 14. Consequently, the current gain of the voltage-to-current converter 2 attains the maximum value, and the light emitting element 3 emits the maximum amount of light at the beginning of the signal input in bursts. This embodiment provides effective control of the optical output at the beginning of the signal input in bursts.

As described hereinbefore, a light emitting control apparatus according to the present invention is provided with the sample-and-hold circuit which tracks the output level of the monitoring circuit, and the amplifier for negative feedback. Therefore, the apparatus can quickly respond to a signal input and keep correct mark and space levels of data for a long time.

Further, a light emitting control apparatus according to the present invention is provided with the sample-and-hold circuit which tracks the output level of the monitoring circuit, the second sample-and-hold circuit which complementarily functions therewith, and the amplifiers, each of which controls mark and space levels of data and supplies a bias current by accomplishing negative feedback. Therefore, the apparatus can quickly respond to a signal input and keep correct mark and space levels of data for a long time.

Still further, in addition to the above-described basic effects, when a sample-and-hold control signal is derived from the output of the monitoring circuit used for the monitoring operation, the circuit construction can be simplified.

Still further, in addition to the above-described basic effects, when a sample-and-hold control signal is derived from the input signal, timing adjustment for the sample-and-hold operation can be facilitated.

Still further, in addition to the above-described basic effects, when the sample-and-hold control period is limited to the period in which the input signal is being input, an ideal waveform for optical transmission can be obtained by controlling a duty ratio of the "1" state to the "0" state of the optical output.

Still further, a light emitting control apparatus according to the present invention is provided with the sample-and-hold circuit for a signal input, the burst detection circuit for the output of the monitoring circuit, and the light off detector. Therefore, in addition to the above-described effects, a part failure can be identified quickly during the mark period of data wherein a signal is actually being input.

Still further, an optical transmitter according to the present invention is provided with a light emitting control apparatus with quick responsiveness. Therefore, an optical transmitter which tracks and quickly responds to a change of the input state, having the stable optical output level and high reliability can be obtained.

As described hereinbefore, in a light emitting control apparatus according to the present invention, the time constant for the sampling operation of the sample-and-hold circuit can be set to be in marked contrast with the time constant for the holding operation. Consequently, fast peak detection becomes possible. Since a detected peak value is retained for a long time, the APC circuit operates stably for the signal input in bursts for a long period.

The time constant for detecting and controlling the input signal is set to be large. Consequently, excessive control for quick responsiveness to an input signal at the beginning of the signal input can be suppressed.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and equivalents thereto.

What is claimed is:

1. An apparatus, having a light emitting element responsive to an input signal and a monitoring circuit for detecting an output level of the light emitting element, for controlling low and high output levels of the light emitting element, comprising:

a first sample-and-hold circuit, having a sample mode and a hold mode, for tracking the output level detected by the monitoring circuit in the sample mode while the input signal is a significant signal, and for holding the output level in the hold mode while the input signal is an insignificant signal; and a first amplifier, receiving an output level from the first sample-and-hold circuit, for controlling one of the low and high output levels of the light emitting element, wherein the first sample-and-hold circuit is controlled by a first sample-and-hold control circuit using the input signal through a first delay circuit.

2. The apparatus according to claim 1, wherein the first sample-and-hold circuit receives high data level as the significant signal, and the light emitting element is controlled as having a predetermined level for the high data level.

3. The apparatus according to claim 1, wherein the first sample-and-hold circuit receives low data level as the significant signal and the light emitting element is controlled as having a zero level for the low data level.

4. The apparatus according to claim 1, further comprising:

a second sample-and-hold circuit, complementarily functioning with the first sample-and-hold circuit, for tracking the output level detected by the monitoring circuit while the first sample-and-hold circuit is in the hold mode, and for holding the output level while the first sample-and-hold circuit is in the sample mode; and a second amplifier, receiving an output of the second sample-and-hold circuit, for controlling an other of the low and high output levels of the light emitting element which is not controlled by the first amplifier.

5. An apparatus, having a light emitting element responsive to an input signal and a monitoring circuit for detecting an output level of the light emitting element, for controlling low and high output levels of the light emitting element, comprising:

a first sample-and-hold circuit, having a sample mode and a hold mode, for tracking the output level detected by the monitoring circuit in the sample mode while the input signal is a significant signal, and for holding the output level in the hold mode while the input signal is an insignificant signal; and a first amplifier, receiving an output level from the first sample-and-hold circuit, for controlling one of the low and high output levels of the light emitting element, wherein the first sample-and-hold circuit is controlled by a first sample-and-hold control circuit using the output level detected by the monitoring circuit.

6. An apparatus, having a light emitting element responsive to an input signal and a monitoring circuit for detecting an output level of the light emitting element, for controlling low and high output levels of the light emitting element, comprising:

a first sample-and-hold circuit having a sample mode and a hold mode, for tracking the output level detected by the monitoring circuit in the sample mode while the input signal is a significant signal, and for holding the output level in the hold mode while the input signal is an insignificant signal;

a first amplifier, receiving an output level from the first sample-and-hold circuit, for controlling one of the low and high output levels of the light emitting element; and a burst detection circuit for detecting an off-state of the input signal for more than a predetermined period, and for controlling the first sample-and-hold circuit while the input signal is detected.

7. The apparatus according to claim 1, further comprising a voltage-to-current converter for converting the input signal into a current signal, wherein the light emitting element is driven by the current signal.

8. The apparatus according to claim 1, further comprising a current-to-voltage converter for converting an output current of the monitoring circuit into a monitoring voltage, wherein the first sample-and-hold circuit receives the monitoring voltage for tracking the output level of the monitoring circuit.

9. An apparatus, having a light emitting element responsive to an input signal and a monitoring circuit for detecting an output level of the light emitting element, for controlling low and high output levels of the light emitting element, comprising:

a first sample-and-hold circuit, having a sample mode and a hold mode, for tracking the output level detected by the monitoring circuit in the sample mode while the input signal is a significant signal, and for holding the output level in the hold mode while the input signal is an insignificant signal;

a first amplifier, receiving an output level from the first sample-and-hold circuit, for controlling one of the low and high output levels of the light emitting element;

a second sample-and-hold circuit, complementarily functioning with the first sample-and-hold circuit, for tracking the output level detected by the monitoring circuit while the first sample-and-hold circuit is in the hold mode, and for holding the output level while the first sample-and-hold circuit is in the sample mode; and a second amplifier, receiving an output of the second sample-and-hold circuit, for controlling another of the low and high output levels of the light emitting element which is not controlled by the first amplifier, wherein the second sample-and-hold circuit is controlled by a second sample-and-hold control circuit using the output level detected by the monitoring circuit.

10. An apparatus, having a light emitting element responsive to an input signal and a monitoring circuit for detecting an output level of the light emitting element, for controlling low and high output levels of the light emitting element, comprising:

a first sample-and-hold circuit, having a sample mode and a hold mode, for tracking the output level detected by the monitoring circuit in the sample mode while the input signal is a significant signal, and for holding the output level in the hold mode while the input signal is an insignificant signal;

a first amplifier, receiving an output level from the first sample-and-hold circuit, for controlling one of the low and high output levels of the light emitting element;

a second sample-and-hold circuit, complementarily functioning with the first sample-and-hold circuit, for tracking the output level detected by the monitoring circuit while the first sample-and-hold circuit is in the hold mode, and for holding the output level while the first sample-and-hold circuit is in the sample mode; and a second amplifier, receiving an output of the second sample-and-hold circuit, for controlling another of the low and high output levels of the light emitting element which is not controlled by the first amplifier, wherein the second sample-and-hold circuit is controlled by a second sample-and-hold control circuit using the input signal through a second delay circuit.

11. An apparatus, having a light emitting element responsive to an input signal and a monitoring circuit for detecting an output level of the light emitting element, for controlling low and high output levels of the light emitting element, comprising:

a first sample-and-hold circuit, having a sample mode and a hold mode, for tracking the output level detected by the monitoring circuit in the sample mode while the input signal is a significant signal, and for holding the output level in the hold mode while the input signal is an insignificant signal;

a first amplifier, receiving an output level from the first sample-and-hold circuit, for controlling one of the low and high output levels of the light emitting element;

a second sample-and-hold circuit, complementarily functioning with the first sample-and-hold circuit, for tracking the output level detected by the monitoring circuit while the first sample-and-hold circuit is in the hold mode, and for holding the output level while the first sample-and-hold circuit is in the sample mode;

a second amplifier, receiving an output of the second sample-and-hold circuit, for controlling another of the low and high output levels of the light emitting element which is not controlled by the first amplifier; and a burst detection circuit for detecting an off-state of the input signal for more than a predetermined period, and for controlling the second sample-and-hold circuit while the input signal is detected.

12. An apparatus, having a light emitting element responsive to an input signal and a monitoring circuit for detecting an output level of the light emitting element, for controlling low and high output levels of the light emitting element, comprising:

a first sample-and-hold circuit, having a sample mode and a hold mode, for tracking the output level detected by the monitoring circuit in the sample mode while the input signal is a significant signal, and for holding the output level in the hold mode while the input signal is an insignificant signal;

a first amplifier, receiving an output level from the first sample-and-hold circuit, for controlling one of the low and high output levels of the light emitting element;

a second sample-and-hold circuit, complementarily functioning with the first sample-and-hold circuit, for tracking the output level detected by the monitoring circuit while the first sample-and-hold circuit is in the hold mode, and for holding the output level while the first sample-and-hold circuit is in the sample mode;

a second amplifier, receiving an output of the second sample-and-hold circuit, for controlling another of the low and high output levels of the light emitting element which is not controlled by the first amplifier; and an adder receiving the input signal and an output of the second amplifier for adjusting the other one of the low and high output levels of the light emitting element.

13. An apparatus, having a light emitting element responsive to an input signal and a monitoring circuit for detecting an output level of the light emitting element, for controlling low and high output levels of the light emitting element, comprising:

a first sample-and-hold circuit, having a sample mode and a hold mode, for tracking the output level detected by the monitoring circuit in the sample mode while the input signal is a significant signal, and for holding the output level in the hold mode while the input signal is an insignificant signal;

a first amplifier, receiving an output level from the first sample-and-hold circuit, for controlling one of the low and high output levels of the light emitting element;

a burst detection circuit, having the sample mode and the hold mode, for tracking a level of the input signal in the sample mode while the input signal is in a high signal level state, and for holding the level of the input signal in the hold mode; and a light off detector for detecting a cutoff of the output level of the light emitting element by comparing the output of the first sample-and-hold circuit and the output of the burst detection circuit.

14. An apparatus, having a light emitting element responsive to an input signal and a monitoring circuit for detecting an output level of the light emitting element, for controlling low and high output levels of the light emitting element, comprising:

a first sample-and-hold circuit, having a sample mode and a hold mode, for tracking the output level detected by the monitoring circuit in the sample mode while the input signal is a significant signal, and for holding the output level in the hold mode while the input signal is an insignificant signal; and a first amplifier, receiving an output level from the first sample-and-hold circuit, for controlling one of the low and high output levels of the light emitting element, wherein the first sample-and-hold circuit includes:

a resistor-capacitor serial circuit; and a first emitter follower for tracking the output level of the monitoring circuit, and for outputting the output level to the resistor-capacitor serial circuit, wherein the resistor-capacitor serial circuit outputs a voltage of a capacitor in the resistor-capacitor serial circuit through a second emitter follower as an output of the first sample-and-hold circuit, and wherein a current of the first emitter follower is turned on/off by a first sample-and-hold control circuit being on/off with a control signal.

15. The apparatus according to claim 14, wherein the second emitter follower includes a Darlington circuit.

16. The apparatus according to claim 14, wherein the first sample-and-hold control circuit is a differential switching circuit having a reference input and an input of the control signal.

17. The apparatus according to claim 16, wherein the reference input is given by the average level of outputs of a second differential switching circuit having a fixed reference input and an input of the control signal.

18. An apparatus, having a light emitting element responsive to an input signal and a monitoring circuit for detecting an output level of the light emitting element, for controlling low and high output levels of the light emitting element, comprising:

a first sample-and-hold circuit, having a sample mode and a hold mode, for tracking the output level detected by the monitoring circuit in the sample mode while the input signal is a significant signal, and for holding the output level in the hold mode while the input signal is an insignificant signal;

a first amplifier, receiving an output level from the first sample-and-hold circuit, for controlling one of the low and high output levels of the light emitting element;

a second sample-and-hold circuit, complementarily functioning with the first sample-and-hold circuit, for tracking the output level detected by the monitoring circuit while the first sample-and-hold circuit is in the hold mode, and for holding the output level while the first sample-and-hold circuit is in the sample mode; and a second amplifier, receiving an output of the second sample-and-hold circuit, for controlling another of the low and high output levels of the light emitting element which is not controlled by the first amplifier, wherein the second sample-and-hold circuit includes:

a resistor-capacitor serial circuit; and a first emitter follower for tracking the output level of the monitoring circuit, and for outputting the output level to the resistor-capacitor serial circuit, wherein the resistor-capacitor serial circuit outputs a voltage of the capacitor in the resistor-capacitor serial circuit through a second emitter follower forming a Darlington circuit, and wherein a current of the first emitter follower is turned on/off by a second sample-and-hold control circuit forming a switching circuit with a reference input and the control signal.

19. An apparatus, having a light emitting element responsive to an input signal and a monitoring circuit for detecting an output level of the light emitting element, for controlling low and high output levels of the light emitting element, comprising:

a first sample-and-hold circuit, having a sample mode and a hold mode, for tracking the output level detected by the monitoring circuit in the sample mode while the input signal is a significant signal, and for holding the output level in the hold mode while the input signal is an insignificant signal;

a first amplifier, receiving an output level from the first sample-and-hold circuit, for controlling one of the low and high output levels of the light emitting element; and a third sample-and-hold circuit having a time constant of two to twenty bits of the input signal, and having the sample mode and the hold mode, for tracking the input signal in the sample mode and for holding the input signal in the hold mode as a reference to the first amplifier.

20. The apparatus according to claim 19, wherein the third sample-and-hold circuit includes:

a resistor-capacitor serial circuit, a first emitter follower for tracking the output level of the monitoring circuit, and for outputting the output level to the resistor-capacitor serial circuit, wherein the resistor-capacitor serial circuit outputs a voltage of a capacitor in the resistor-capacitor serial circuit through a second emitter follower, and wherein a current of the first emitter follower is turned on/off by a third sample-and-hold control circuit being on/off with a control signal.

21. A method for controlling low and high output levels of a light emitting element comprising the steps of:

(a) detecting the output level of the light emitting element;

(b) sampling the detected output level of the light emitting element to produce a first control signal while an input signal is in a first state;

(c) holding the detected output level of the light emitting element to produce the first control signal while the input signal is in a second state;

(d) controlling at least one of the high and low output levels of the light emitting element based upon the first control signal;

(e) delaying the input signal; and (f) determining the first and second states of the input signal based upon the delayed input signal.

22. The method according to claim 21, wherein the controlling step controls the light emitting element to a predetermined high data level when the input signal is in a high state.

23. The method according to claim 21, wherein the controlling step controls the light emitting element to a low data level of low data when the input signal is in a low state.

24. The method of claim 21, further comprising the steps of:

(g) sampling the detected output level of the light emitting element when the input signal is in the second state to produce a second control signal;

(h) holding the detected output level of the light emitting element when the input signal is in the first state to produce the second control signal; and (i) controlling an other one of the high and low output levels of the light emitting element based upon the second control signal.

25. A method for controlling low and high output levels of a light emitting element comprising the steps of:

(a) detecting the output level of the light emitting element;

(b) sampling the detected output level of the light emitting element to produce a first control signal while an input signal is in a first state;

(c) holding the detected output level of the light emitting element to produce the first control signal while the input signal is in a second state;

(d) controlling at least one of the high and low output levels of the light emitting element based upon the first control signal; and (e) determining the first and second states of the input signal based upon the output level of the light emitting element detected by the monitoring circuit.

26. A method for controlling low and high output levels of a light emitting element comprising the steps of:

(a) detecting the output level of the light emitting element;

(b) sampling the detected output level of the light emitting element to produce a first control signal while an input signal is in a first state;

(c) holding the detected output level of the light emitting element to produce the first control signal while the input signal is in a second state;

(d) controlling at least one of the high and low output levels of the light emitting element based upon the first control signal; and (e) detecting an off-state of the input signal for more than a predetermined period, and causing the sampling and holding steps to occur while the input signal is detected.

27. The method of claim 21, further comprising the steps of converting the input signal into a current signal, and driving the light emitting element by the current signal.

28. The method of claim 21, further comprising the steps of converting the detected output level of the light emitting element into a voltage, and determining the first and second states of the input signal based upon the voltage.

29. A method for controlling low and high output levels of a light emitting element comprising the steps of:

(a) detecting the output level of the light emitting element;

(b) sampling the detected output level of the light emitting element to produce a first control signal while an input signal is in a first state;

(c) holding the detected output level of the light emitting element to produce the first control signal while the input signal is in a second state;

(d) controlling at least one of the high and low output levels of the light emitting element based upon the first control signal;

(e) sampling the detected output level of the light emitting element when the input signal is in the second state to produce a second control signal;

(f) holding the detected output level of the light emitting element when the input signal is in the first state to produce the second control signal;

(g) controlling an other one of the high and low output levels of the light emitting element based upon the second control signal; and (h) determining the first and second states of the input signal by using the detected output level of the light emitting element.

30. A method for controlling low and high output levels of a light emitting element comprising the steps of:

(a) detecting the output level of the light emitting element;

(b) sampling the detected output level of the light emitting element to produce a first control signal while an input signal is in a first state;

(c) holding the detected output level of the light emitting element to produce the first control signal while the input signal is in a second state;

(d) controlling at least one of the high and low output levels of the light emitting element based upon the first control signal;

(e) sampling the detected output level of the light emitting element when the input signal is in the second state to produce a second control signal;

(f) holding the detected output level of the light emitting element when the input signal is in the first state to produce the second control signal;

(g) controlling an other one of the high and low output levels of the light emitting element based upon the second control signal;

(h) delaying the input signal; and (i) determining the first and second states of the input signal based upon the delayed input signal.

31. A method for controlling low and high output levels of a light emitting element comprising the steps of:

(a) detecting the output level of the light emitting element;

(b) sampling the detected output level of the light emitting element to produce a first control signal while an input signal is in a first state;

(c) holding the detected output level of the light emitting element to produce the first control signal while the input signal is in a second state;

(d) controlling at least one of the high and low output levels of the light emitting element based upon the first control signal;

(e) sampling the detected output level of the light emitting element when the input signal is in the second state to produce a second control signal;

(f) holding the detected output level of the light emitting element when the input signal is in the first state to produce the second control signal; and (g) controlling an other one of the high and low output levels of the light emitting element based upon the second control signal;

(h) detecting an off-state of the input signal for more than a predetermined period, and (i) causing the sampling and holding steps of the second control signal to occur while the input signal is detected.

32. A method for controlling low and high output levels of a light emitting element comprising the steps of:

(a) detecting the output level of the light emitting element;

(b) sampling the detected output level of the light emitting element to produce a first control signal while an input signal is in a first state;

(c) holding the detected output level of the light emitting element to produce the first control signal while the input signal is in a second state;

(d) controlling at least one of the high and low output levels of the light emitting element based upon the first control signal;

(e) sampling the detected output level of the light emitting element when the input signal is in the second state to produce a second control signal;

(f) holding the detected output level of the light emitting element when the input signal is in the first state to produce the second control signal; and (g) controlling an other one of the high and low output levels of the light emitting element based upon the second control signal, wherein the controlling step includes combining the input signal and the second control signal.

33. A method for controlling low and high output levels of a light emitting element comprising the steps of:

(a) detecting the output level of the light emitting element;

(b) sampling the detected output level of the light emitting element to produce a first control signal while an input signal is in a first state;

(c) holding the detected output level of the light emitting element to produce the first control signal while the input signal is in a second state;

(d) controlling at least one of the high and low output levels of the light emitting element based upon the first control signal;

(e) tracking the level of the high level input signal while in the sample mode to produce a burst signal;

(f) holding the level of the input signal while in the hold mode to produce the burst signal; and (g) detecting the cutoff of the output level of the light emitting element by comparing the first control signal and the burst signal.

34. An apparatus for controlling low and high output levels of a light emitting element comprising:

(a) means for detecting the output level of the light emitting element;

(b) means for sampling the detected output level of the light emitting element to produce a first control signal while an input signal is in a first state;

(c) means for holding the detected output level of the light emitting element to produce the first control signal while the input signal is in a second state;

(d) means for controlling at least one of the high and low output levels of the light emitting element based upon the first control signal;

(e) means for tracking the level of the high level input signal while in the sample mode to produce a burst signal;

(f) means for holding the level of the input signal while in the hold mode to produce the burst signal; and (g) means for detecting the cutoff of the output level of the light emitting element by comparing the first control signal and the burst signal.

* * * * *

UNITED STATES PATENT AND TRADEMARK OFFICE
CERTIFICATE OF CORRECTION

PATENT NO. : 5,978,124
DATED : November 2, 1999
INVENTOR(S) : Maekawa et al.

It is certified that error appears in the above-identified patent and that said Letters Patent is hereby corrected as shown below:

On the title page, in item "[73] Assignee:" please change the assignee from "Mitsubishi Denki Kabushiki Kaisha, Tokyo, Japan" to -- Mitsubishi Denki Kabushiki Kaisha and Nippon Telegraph and Telephone Corporation; both of Tokyo, Japan --.

Signed and Sealed this

Fifteenth Day of August, 2000

Attest:

Q. TODD DICKINSON

*Attesting Officer*   *Director of Patents and Trademarks*